US012694600B2

(12) United States Patent
Ting et al.

(10) Patent No.: US 12,694,600 B2
(45) Date of Patent: Jul. 28, 2026

(54) METHODS, STORAGE MEDIA, AND SYSTEMS FOR SELECTING A PAIR OF CONSISTENT REAL-WORLD CAMERA POSES

(71) Applicant: Hover Inc., San Francisco, CA (US)

(72) Inventors: Weien Ting, Poway, CA (US); Zhiyao Xiong, San Mateo, CA (US)

(73) Assignee: Hover Inc., San Francisco, CA (US)

( * ) Notice: Subject to any disclaimer, the term of this patent is extended or adjusted under 35 U.S.C. 154(b) by 155 days.

(21) Appl. No.: 18/625,574

(22) Filed: Apr. 3, 2024

(65) Prior Publication Data

US 2024/0338879 A1 Oct. 10, 2024

Related U.S. Application Data

(60) Provisional application No. 63/573,416, filed on Apr. 2, 2024, provisional application No. 63/572,897, filed on Apr. 1, 2024, provisional application No. 63/597,954, filed on Nov. 10, 2023, provisional application No. 63/494,752, filed on Apr. 6, 2023.

(51) Int. Cl.
G06T 15/00 (2011.01)
G06T 7/70 (2017.01)

(52) U.S. Cl.
CPC ............... G06T 15/00 (2013.01); G06T 7/70 (2017.01)

(58) Field of Classification Search
CPC .................................. G06T 15/00; G06T 7/70
USPC ........................................................ 345/419
See application file for complete search history.

(56) References Cited

U.S. PATENT DOCUMENTS 8,798,965 B2 * 8/2014 Quan ...................... G06T 7/579
382/173
2023/0079136 A1 * 3/2023 Bondich ................. G06T 19/20
345/419

OTHER PUBLICATIONS

Tang et al., "Projective reconstruction from line-correspondences in multiple uncalibrated images", (year 2006), Pattern Recognition 39 (2006) 889-896, (year 2006).*
PCT International Search Report and Written Opinion dated Jun. 21, 2024 for PCT/US2024/023020, 12 pages.
Pollefeys et al. "Detailed Real-Time Urban 3D Reconstruction from Video," Int J Comput Vis 78: 143-167 (2008).
Tang et al. "Projective reconstruction from line-correspondences in multiple uncalibrated images," Pattern Recognition 39: 889-896 (2006).

* cited by examiner

*Primary Examiner* — Hai Tao Sun

(57) ABSTRACT

Disclosed are methods, storage media, and systems for selecting a pair of consistent real-world camera poses for 3D reconstruction. The disclosed processes involve capturing multiple images of an object from various camera poses and analyzing the images and camera poses to select a consistent pair of camera poses. This selection is based on calculating perturbation errors and reprojection errors generated from 2D points or 2D line segments in the images. A weight is calculated for each camera pose pair based on these errors, and the pair with the largest weight, indicative of the highest consistency and stability, is selected.

18 Claims, 20 Drawing Sheets

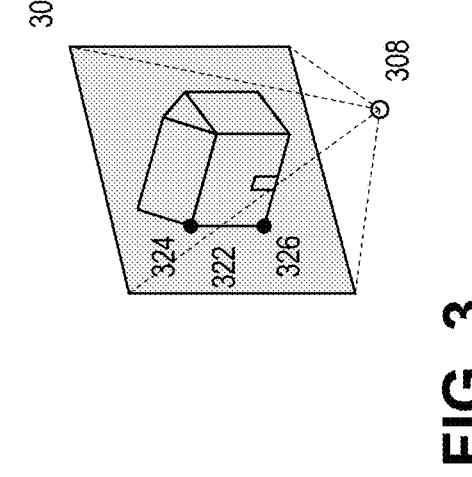
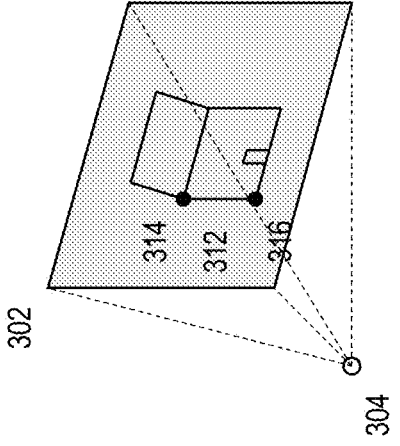
FIG. 3

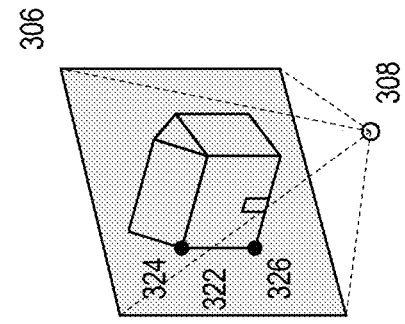
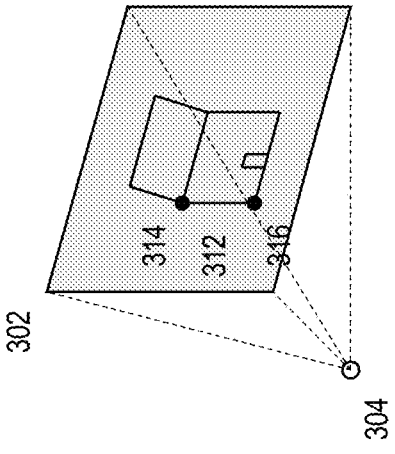
FIG. 5

Computing Platform(s) 802

Electronic Storage 826

Processor(s) 828

Machine-Readable Instructions 806

Image Receiving Module 808

Camera Pose Receiving Module 810

2D Line Segment Receiving Module 812

3D Ray Generation Module 814

3D Point Generation Module 816

3D Point Projection Module 818

Score Calculation Module 820

Camera Pose Pair Selection Module 822

Remote Platform(s) 804

External Resources 824

800

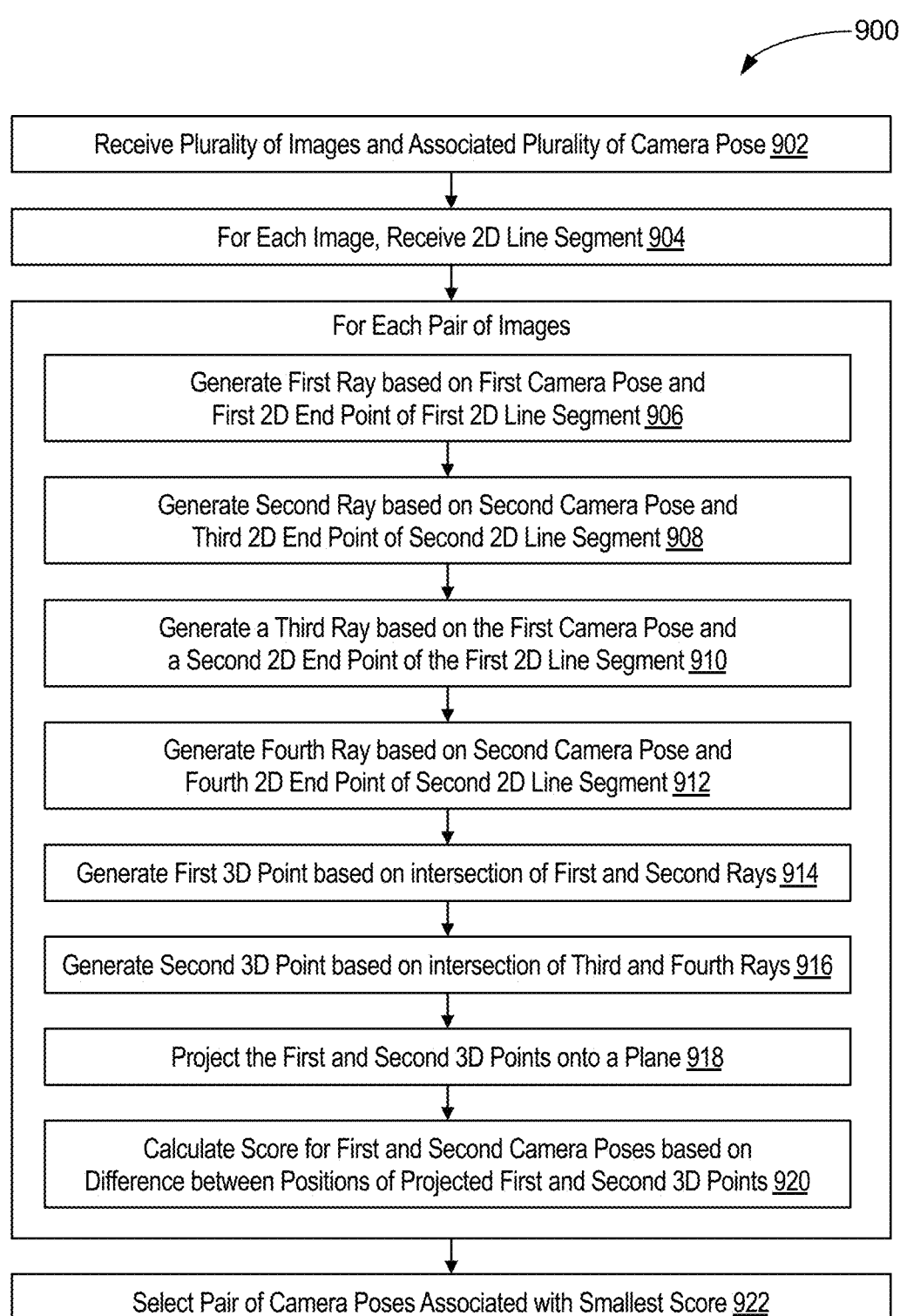

900

Receive Plurality of Images and Associated Plurality of Camera Pose 902

For Each Image, Receive 2D Line Segment 904

For Each Pair of Images

Generate First Ray based on First Camera Pose and
First 2D End Point of First 2D Line Segment 906

Generate Second Ray based on Second Camera Pose and
Third 2D End Point of Second 2D Line Segment 908

Generate a Third Ray based on the First Camera Pose and
a Second 2D End Point of the First 2D Line Segment 910

Generate Fourth Ray based on Second Camera Pose and
Fourth 2D End Point of Second 2D Line Segment 912

Generate First 3D Point based on intersection of First and Second Rays 914

Generate Second 3D Point based on intersection of Third and Fourth Rays 916

Project the First and Second 3D Points onto a Plane 918

Calculate Score for First and Second Camera Poses based on
Difference between Positions of Projected First and Second 3D Points 920

Select Pair of Camera Poses Associated with Smallest Score 922

FIG. 9

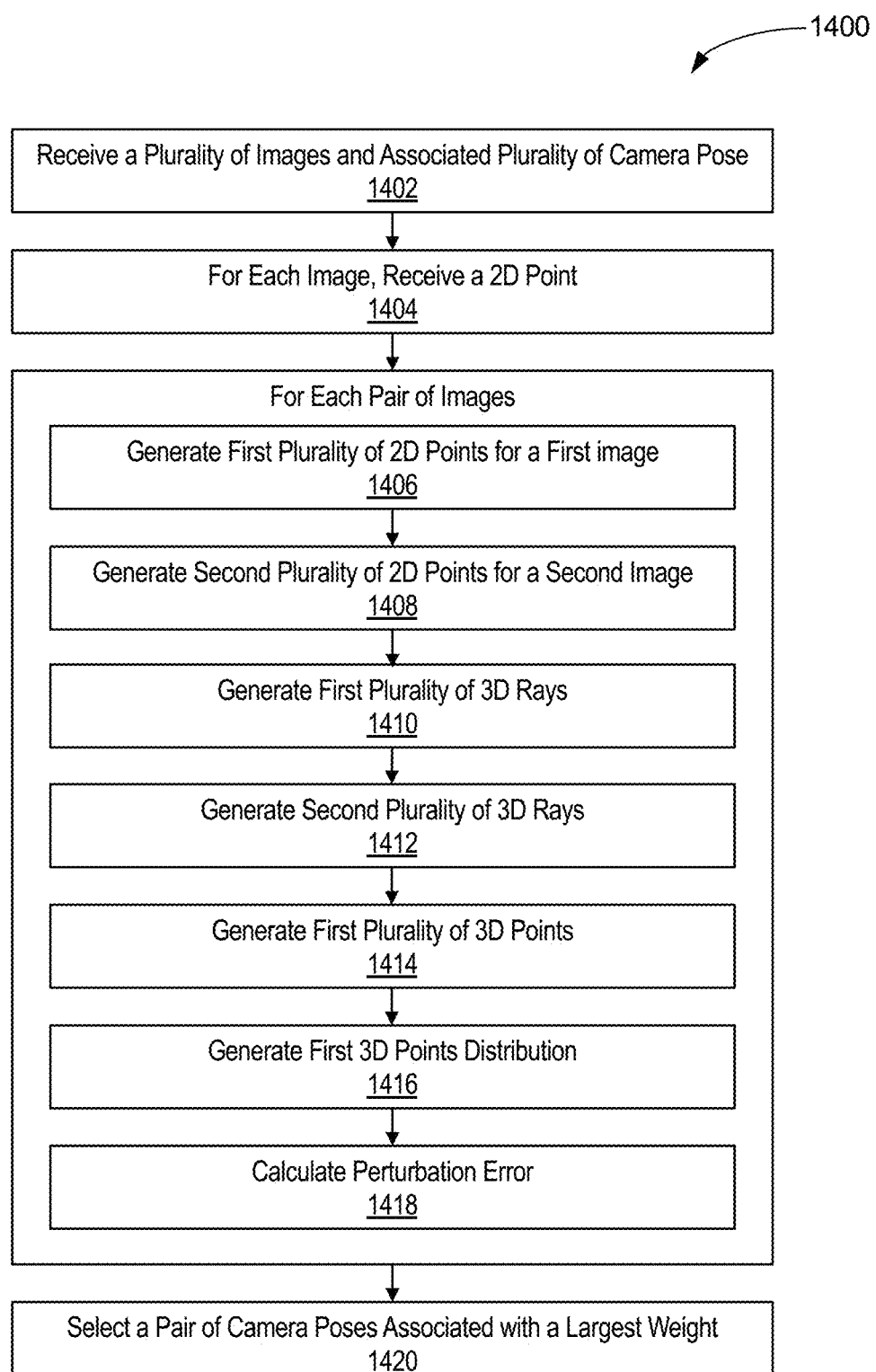

1400

Receive a Plurality of Images and Associated Plurality of Camera Pose
1402

For Each Image, Receive a 2D Point
1404

For Each Pair of Images

Generate First Plurality of 2D Points for a First image
1406

Generate Second Plurality of 2D Points for a Second Image
1408

Generate First Plurality of 3D Rays
1410

Generate Second Plurality of 3D Rays
1412

Generate First Plurality of 3D Points
1414

Generate First 3D Points Distribution
1416

Calculate Perturbation Error
1418

Select a Pair of Camera Poses Associated with a Largest Weight
1420

FIG. 14

METHODS, STORAGE MEDIA, AND SYSTEMS FOR SELECTING A PAIR OF CONSISTENT REAL-WORLD CAMERA POSES

CROSS REFERENCE TO RELATED APPLICATIONS

The present application claims priority to provisional patent application 63/573,416 entitled "METHODS, STORAGE MEDIA, AND SYSTEMS FOR SELECTING A PAIR OF CONSISTENT REAL-WORLD CAMERA POSES," filed Apr. 2, 2024, provisional patent application 63/572,897 entitled "METHODS, STORAGE MEDIA, AND SYSTEMS FOR SELECTING A PAIR OF CONSISTENT REAL-WORLD CAMERA POSES," filed Apr. 1, 2024, provisional patent application 63/597,954 entitled "METHODS, STORAGE MEDIA, AND SYSTEMS FOR EVALUATING CAMERA POSES," filed Nov. 10, 2023, and provisional patent application 63/494,752 entitled "METHODS, STORAGE MEDIA, AND SYSTEMS FOR EVALUATING CAMERA POSES," filed Apr. 6, 2023, and which are hereby incorporated by reference in their entirety and made part of the present application for all purposes.

BACKGROUND

Field of the Disclosure

The present disclosure relates to methods, storage media, and systems for selecting a pair of consistent real-world camera poses for three-dimensional reconstruction.

Brief Description of the Related Art

Three-dimensional (3D) reconstructions may include digital representations of real-world objects, such as an interior or an exterior of a building object. Generating a 3D reconstruction may involve capturing images of a real-world object from multiple camera poses and using the images and poses to generate a 3D reconstruction of the real-world object. The quality of the 3D reconstruction may be dependent on the consistency of camera poses. Small deviations in the camera pose may lead to large errors in the resulting 3D reconstruction. High quality 3D reconstructions may be integral in applications where accuracy is paramount.

Selecting consistent camera poses may be challenging due to various factors such as camera pose drift, capture device calibration errors, inherent limitations of sensors of a capture device, environmental or scene conditions, and the like. These factors may lead to inconsistencies of camera poses, which in turn may affect the quality of the 3D reconstruction.

To ensure fidelity of 3D reconstructions, it is essential to select consistent camera poses. Selecting consistent camera poses may involve complex computations and can be computationally intensive, especially when dealing with a large number of camera poses. As the demand for 3D reconstructions grows, so does the need for robust and efficient techniques for selecting consistent camera poses to facilitate 3D reconstruction.

SUMMARY

The present disclosure pertains to the field of computer vision and addresses the challenge of selecting consistent real-world camera poses for generating accurate three-dimensional (3D) reconstructions from two-dimensional (2D) images. The process may involve capturing images of a real-world object from various camera poses and utilizing the images along with the corresponding camera poses to create a 3D reconstruction of the object. Ensuring the consistency of camera poses is crucial, as discrepancies can introduce errors into the 3D reconstruction, which is particularly detrimental in applications where precision is critical.

Previous approaches to addressing the problem of camera pose inconsistencies include methods such as iterative closest point (ICP) algorithms, bundle adjustment techniques, and feature-based matching. These methods, however, are often challenged by their computational demands, reliance on initial estimates or manual input, and vulnerability to errors in feature detection, particularly in complex scenes with occlusions or repetitive patterns.

The present disclosure includes methods, storage media, and systems for selecting consistent camera poses that significantly mitigate the aforementioned challenges. In some embodiments, approaches may include assessing the stability of camera poses through a perturbation analysis. In some embodiments, approaches may include evaluating the accuracy of the camera poses through a reprojection analysis. Alone or in combination, the approaches may determine a consistent pair of camera poses from a given set of camera poses, thereby enhancing the quality of the 3D reconstruction.

In some embodiments, perturbation analysis provides a measure of how stable selected corresponding 2D points of a pair of images are with respect to small changes in their position in 2D space (i.e., in an image plane) by shifting the selected corresponding 2D points in each image in 2D space and evaluating a distribution related to their 3D projections in 3D space in the form of a perturbation error. The small changes of the 2D points represent a comparative offset that when evaluated as 3D projections may indicate sensitivity of the 2D points. In some embodiments, larger sensitivity may be indicative of less stability of 2D points and smaller sensitivity may be indicative of more stability of 2D points. The selected corresponding 2D points may be specified markups. In some embodiments, perturbation analysis involves simulating various types of perturbations, for example roll, pitch, and/or yaw shifts, to assess stability of selected corresponding 2D points. The perturbation error may be calculated using statistical methods that consider distributions in 3D space resulting from the perturbations. One or more thresholds, for example relative thresholds, for determining stability may be used for flexibility in various conditions without being confined to a specific error range.

In some embodiments, reprojection analysis provides a measure of how a 3D point or 3D line segment from a triangulation of selected corresponding 2D points or selected corresponding 2D line segments from a pair of images compares to selected corresponding 2D points or selected corresponding 2D line segments in the images. In some embodiments, this is by projecting selected corresponding 2D points or selected corresponding 2D line segments from a pair of 2D images into 3D space to generate 3D points or 3D line segments and projecting the 3D points or 3D line segments into 2D image space of images other than the pair and quantifying discrepancies between the selected corresponding 2D points or the selected corresponding 2D line segments in the images and the reprojected 3D points or reprojected 3D line segments in the form of a reprojection error. The selected corresponding 2D points and/or the selected corresponding 2D lines may be specified markups.

In some embodiments, reprojection analysis may utilize one or more projection models, such as perspective projections, to map 3D points or 3D line segments back into 2D image space. Discrepancies may be quantified by calculating a Euclidean distance between reprojected 3D points or reprojected 3D line segments and the selected corresponding 2D points or 2D line segments.

The disclosure effectively addresses the problem of inconsistent camera poses by projecting 2D points near specified markups in 2D images into 3D space relative to an image pair and by projecting 3D points or 3D line segments into 2D images. A pair of camera poses is then selected based on qualifying variations when compared to other camera pose pairs. This approach ensures the selection of the most consistent camera pose pairs, thereby enhancing the fidelity of the 3D reconstruction by leveraging such consistent pairs and making the process more robust and reliable for various applications.

Some aspects of the present disclosure relate to a method of selecting a pair of consistent real-world camera poses for three-dimensional reconstruction. The method may include receiving a plurality of images and an associated plurality of camera poses. The method may include, for each image of the plurality of images, receiving a two-dimensional (2D) line segment, wherein the 2D line segments of the plurality of images correspond to one another. The method may include, for each pair of images of the plurality of images: generating a first point based at least in part on a first 2D line segment of a first image of the pair of images, a second 2D line segment of a second image of the pair of images, a first camera location of the first image of the pair of images, and a second camera location of the second image of the pair of images, generating a first three-dimensional (3D) line based on the first point, wherein the first 3D line comprises the first point, projecting the first 2D line segment onto the first 3D line to generate a first projected line segment comprising a first 3D end point and a second 3D end point, projecting the second 2D line segment onto the first 3D line to generate a second projected line segment comprising a third 3D end point and a fourth 3D end point, and calculating a score for a first camera pose associated with the first image and a second camera pose associated with the second image based at least in part on: a difference between a first 3D length of the first projected line segment and a second 3D length of the second projected line segment, and a difference between a point of the first projected line segment and a corresponding point of the second projected line segment. The method may include selecting a pair of camera poses of the plurality of camera poses associated with a smallest score.

Some aspects of the present disclosure relate to one or more non-transitory computer-readable media storing instructions that, when executed by one or more processors, cause the one or more processors to perform a method of selecting a pair of consistent real-world camera poses for three-dimensional reconstruction. The method may include receiving a plurality of images and an associated plurality of camera poses. The method may include, for each image of the plurality of images, receiving a two-dimensional (2D) line segment, wherein the 2D line segments of the plurality of images correspond to one another. The method may include, for each pair of images of the plurality of images: generating a first point based at least in part on a first 2D line segment of a first image of the pair of images, a second 2D line segment of a second image of the pair of images, a first camera location of the first image of the pair of images, and a second camera location of the second image of the pair of images, generating a first three-dimensional (3D) line based on the first point, wherein the first 3D line comprises the first point, projecting the first 2D line segment onto the first 3D line to generate a first projected line segment comprising a first 3D end point and a second 3D end point, projecting the second 2D line segment onto the first 3D line to generate a second projected line segment comprising a third 3D end point and a fourth 3D end point, and calculating a score for a first camera pose associated with the first image and a second camera pose associated with the second image based at least in part on: a difference between a first 3D length of the first projected line segment and a second 3D length of the second projected line segment, and a difference between a point of the first projected line segment and a corresponding point of the second projected line segment. The method may include selecting a pair of camera poses of the plurality of camera poses associated with a smallest score.

Some aspects of the present disclosure relate to a system for selecting a pair of consistent real-world camera poses for three-dimensional reconstruction. The system may include one or more processors and memory storing instructions that, when executed by the one or more processors, cause the system to perform a method. The method may include receiving a plurality of images and an associated plurality of camera poses. The method may include, for each image of the plurality of images, receiving a two-dimensional (2D) line segment, wherein the 2D line segments of the plurality of images correspond to one another. The method may include, for each pair of images of the plurality of images: generating a first point based at least in part on a first 2D line segment of a first image of the pair of images, a second 2D line segment of a second image of the pair of images, a first camera location of the first image of the pair of images, and a second camera location of the second image of the pair of images, generating a first three-dimensional (3D) line based on the first point, wherein the first 3D line comprises the first point, projecting the first 2D line segment onto the first 3D line to generate a first projected line segment comprising a first 3D end point and a second 3D end point, projecting the second 2D line segment onto the first 3D line to generate a second projected line segment comprising a third 3D end point and a fourth 3D end point, and calculating a score for a first camera pose associated with the first image and a second camera pose associated with the second image based at least in part on: a difference between a first 3D length of the first projected line segment and a second 3D length of the second projected line segment, and a difference between a point of the first projected line segment and a corresponding point of the second projected line segment. The method may include selecting a pair of camera poses of the plurality of camera poses associated with a smallest score.

Some aspects of the present disclosure relate to a method of selecting a pair of consistent real-world camera poses for three-dimensional reconstruction. The method may include receiving a plurality of images and an associated plurality of camera poses. The method may include, for each image of the plurality of images, receiving a two-dimensional (2D) line segment, wherein the 2D line segments of the plurality of images correspond to one another. The method may include, for each pair of images of the plurality of images: generating a first 3D ray based at least in part on a first camera pose of a first image of the pair of images and a first 2D end point of a first 2D line segment of the first image of the pair of images, generating a second 3D ray based at least in part on a second camera pose of a second image of the pair of images and a third 2D end point of a second 2D line segment of the second image of the pair of images, generating a third 3D ray based at least in part on the first camera pose and a second 2D end point of the first 2D line segment, generating a fourth 3D ray based at least in part on the second camera pose and a fourth 2D end point of the second 2D line segment, wherein the first 2D end point of the first 2D line segment corresponds to the third 2D end point of the second 2D line segment, and wherein the second 2D end point of the first 2D line segment corresponds to the fourth 2D end point of the second 2D line segment, generating a first 3D point based on an intersection of the first 3D ray and the second 3D ray, generating a second 3D point based on an intersection of the third 3D ray and the fourth 3D ray, projecting the first and second 3D points onto a plane to generate first and second projected points, and calculating a score for the first camera pose and the second camera pose based on a difference between a position of the first projected point and a position of the second projected point. The method may include selecting a pair of camera poses of the plurality of camera poses associated with a smallest score.

Some aspects of the present disclosure relate to one or more non-transitory computer-readable media storing instructions that, when executed by one or more processors, cause the one or more processors to perform a method of selecting a pair of consistent real-world camera poses for three-dimensional reconstruction. The method may include receiving a plurality of images and an associated plurality of camera poses. The method may include, for each image of the plurality of images, receiving a two-dimensional (2D) line segment, wherein the 2D line segments of the plurality of images correspond to one another. The method may include, for each pair of images of the plurality of images: generating a first 3D ray based at least in part on a first camera pose of a first image of the pair of images and a first 2D end point of a first 2D line segment of the first image of the pair of images, generating a second 3D ray based at least in part on a second camera pose of a second image of the pair of images and a third 2D end point of a second 2D line segment of the second image of the pair of images, generating a third 3D ray based at least in part on the first camera pose and a second 2D end point of the first 2D line segment, generating a fourth 3D ray based at least in part on the second camera pose and a fourth 2D end point of the second 2D line segment, wherein the first 2D end point of the first 2D line segment corresponds to the third 2D end point of the second 2D line segment, and wherein the second 2D end point of the first 2D line segment corresponds to the fourth 2D end point of the second 2D line segment, generating a first 3D point based on an intersection of the first 3D ray and the second 3D ray, generating a second 3D point based on an intersection of the third 3D ray and the fourth 3D ray, projecting the first and second 3D points onto a plane to generate first and second projected points, and calculating a score for the first camera pose and the second camera pose based on a difference between a position of the first projected point and a position of the second projected point. The method may include selecting a pair of camera poses of the plurality of camera poses associated with a smallest score.

Some aspects of the present disclosure relate to a system for selecting a pair of consistent real-world camera poses for three-dimensional reconstruction. The system may include one or more processors and memory storing instructions that, when executed by the one or more processors, cause the system to perform a method. The method may include receiving a plurality of images and an associated plurality of camera poses. The method may include, for each image of the plurality of images, receiving a two-dimensional (2D) line segment, wherein the 2D line segments of the plurality of images correspond to one another. The method may include, for each pair of images of the plurality of images: generating a first 3D ray based at least in part on a first camera pose of a first image of the pair of images and a first 2D end point of a first 2D line segment of the first image of the pair of images, generating a second 3D ray based at least in part on a second camera pose of a second image of the pair of images and a third 2D end point of a second 2D line segment of the second image of the pair of images, generating a third 3D ray based at least in part on the first camera pose and a second 2D end point of the first 2D line segment, generating a fourth 3D ray based at least in part on the second camera pose and a fourth 2D end point of the second 2D line segment, wherein the first 2D end point of the first 2D line segment corresponds to the third 2D end point of the second 2D line segment, and wherein the second 2D end point of the first 2D line segment corresponds to the fourth 2D end point of the second 2D line segment, generating a first 3D point based on an intersection of the first 3D ray and the second 3D ray, generating a second 3D point based on an intersection of the third 3D ray and the fourth 3D ray, projecting the first and second 3D points onto a plane to generate first and second projected points, and calculating a score for the first camera pose and the second camera pose based on a difference between a position of the first projected point and a position of the second projected point. The method may include selecting a pair of camera poses of the plurality of camera poses associated with a smallest score.

Some aspects of the present disclosure relate to a method of selecting a pair of consistent real-world camera poses for three-dimensional reconstruction. The method may include receiving a plurality of images and an associated plurality of camera poses. The method may include, for each image of the plurality of images, receiving a two-dimensional (2D) line segment, wherein the 2D line segments of the plurality of images correspond to one another. The method may include for each pair of images of the plurality of images: calculating a perturbation error, generating a three-dimensional (3D) line segment based on the 2D line segment in a first image of the pair of images and the 2D line segment in a second image of the pair of images, calculating reprojection errors of the 3D line segment into each of the plurality of images, and calculating a weight based on the perturbation error and the reprojection errors. The method may include selecting a pair of camera poses of pairs of camera poses associated with a largest weight.

Some aspects of the present disclosure relate to one or more non-transitory computer-readable media storing instructions that, when executed by one or more processors, cause the one or more processors to perform a method of selecting a pair of consistent real-world camera poses for three-dimensional reconstruction. The method may include receiving a plurality of images and an associated plurality of camera poses. The method may include, for each image of the plurality of images, receiving a two-dimensional (2D) line segment, wherein the 2D line segments of the plurality of images correspond to one another. The method may include for each pair of images of the plurality of images: calculating a perturbation error, generating a three-dimensional (3D) line segment based on the 2D line segment in a first image of the pair of images and the 2D line segment in a second image of the pair of images, calculating reprojection errors of the 3D line segment into each of the plurality of images, and calculating a weight based on the perturbation error and the reprojection errors. The method may include selecting a pair of camera poses of pairs of camera poses associated with a largest weight.

Some aspects of the present disclosure relate to a system for selecting a pair of consistent real-world camera poses for three-dimensional reconstruction. The system may include one or more processors and memory storing instructions that, when executed by the one or more processors, cause the system to perform a method. The method may include receiving a plurality of images and an associated plurality of camera poses. The method may include, for each image of the plurality of images, receiving a two-dimensional (2D) line segment, wherein the 2D line segments of the plurality of images correspond to one another. The method may include for each pair of images of the plurality of images: calculating a perturbation error, generating a three-dimensional (3D) line segment based on the 2D line segment in a first image of the pair of images and the 2D line segment in a second image of the pair of images, calculating reprojection errors of the 3D line segment into each of the plurality of images, and calculating a weight based on the perturbation error and the reprojection errors. The method may include selecting a pair of camera poses of pairs of camera poses associated with a largest weight.

Some aspects of the present disclosure relate to a method of selecting a pair of consistent real-world camera poses for three-dimensional reconstruction. The method may include receiving a plurality of images and an associated plurality of camera poses. The method may include for each image of the plurality of images, receiving a two-dimensional (2D) point, wherein the 2D points of the plurality of images correspond to one another. The method may include, for each pair of images of the plurality of images: generating a first plurality of 2D points for a first image of the pair of images, the first plurality of 2D points comprising a first received 2D point and a plurality of points around the first received 2D point, generating a second plurality of 2D points for a second image of the pair of images, the second plurality of 2D points comprising a second received 2D point and a plurality of points around the second received 2D point, generating a first plurality three-dimensional (3D) lines based at least in part on a first camera pose associated with the first image and the first plurality of 2D points, generating a second plurality of 3D rays based at least in part on a second camera pose associated with the second image and the second plurality of 2D points, generating a first plurality of 3D points based on intersections of the first plurality of 3D rays and the second plurality of 3D rays, generating a first 3D point distribution of the first plurality of 3D points, and calculating a perturbation error based on a degree of the 3D point distribution. The method may include selecting a pair of camera poses of pairs of camera poses associated with a smallest perturbation error.

Some aspects of the present disclosure may include one or more non-transitory computer-readable media storing instructions that, when executed by one or more processors, cause the one or more processors to perform a method of selecting a pair of consistent real-world camera poses for three-dimensional reconstruction. The method may include receiving a plurality of images and an associated plurality of camera poses. The method may include for each image of the plurality of images, receiving a two-dimensional (2D) point, wherein the 2D points of the plurality of images correspond to one another. The method may include, for each pair of images of the plurality of images: generating a first plurality of 2D points for a first image of the pair of images, the first plurality of 2D points comprising a first received 2D point and a plurality of points around the first received 2D point, generating a second plurality of 2D points for a second image of the pair of images, the second plurality of 2D points comprising a second received 2D point and a plurality of points around the second received 2D point, generating a first plurality three-dimensional (3D) lines based at least in part on a first camera pose associated with the first image and the first plurality of 2D points, generating a second plurality of 3D rays based at least in part on a second camera pose associated with the second image and the second plurality of 2D points, generating a first plurality of 3D points based on intersections of the first plurality of 3D rays and the second plurality of 3D rays, generating a first 3D point distribution of the first plurality of 3D points, and calculating a perturbation error based on a degree of the 3D point distribution. The method may include selecting a pair of camera poses of pairs of camera poses associated with a smallest perturbation error.

Some aspects of the present disclosure may include a system for selecting a pair of consistent real-world camera poses for three-dimensional reconstruction. The system may include one or more processors and memory storing instructions that, when executed by the one or more processors, cause the system to perform a method. The method may include receiving a plurality of images and an associated plurality of camera poses. The method may include for each image of the plurality of images, receiving a two-dimensional (2D) point, wherein the 2D points of the plurality of images correspond to one another. The method may include, for each pair of images of the plurality of images: generating a first plurality of 2D points for a first image of the pair of images, the first plurality of 2D points comprising a first received 2D point and a plurality of points around the first received 2D point, generating a second plurality of 2D points for a second image of the pair of images, the second plurality of 2D points comprising a second received 2D point and a plurality of points around the second received 2D point, generating a first plurality three-dimensional (3D) lines based at least in part on a first camera pose associated with the first image and the first plurality of 2D points, generating a second plurality of 3D rays based at least in part on a second camera pose associated with the second image and the second plurality of 2D points, generating a first plurality of 3D points based on intersections of the first plurality of 3D rays and the second plurality of 3D rays, generating a first 3D point distribution of the first plurality of 3D points, and calculating a perturbation error based on a degree of the 3D point distribution. The method may include selecting a pair of camera poses of pairs of camera poses associated with a smallest perturbation error.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIGS. 3-7 are exemplary illustrations of calculating a score for a pair of camera poses, in accordance with one or more implementations.

FIG. 9 illustrates a method for selecting a pair of consistent real-world camera poses for three-dimensional reconstruction, in accordance with one or more implementations.

FIG. 14 illustrates a method of selecting a pair of consistent real-world camera poses for three-dimensional reconstruction, in accordance with one or more implementations.

DETAILED DESCRIPTION

Figure 1:
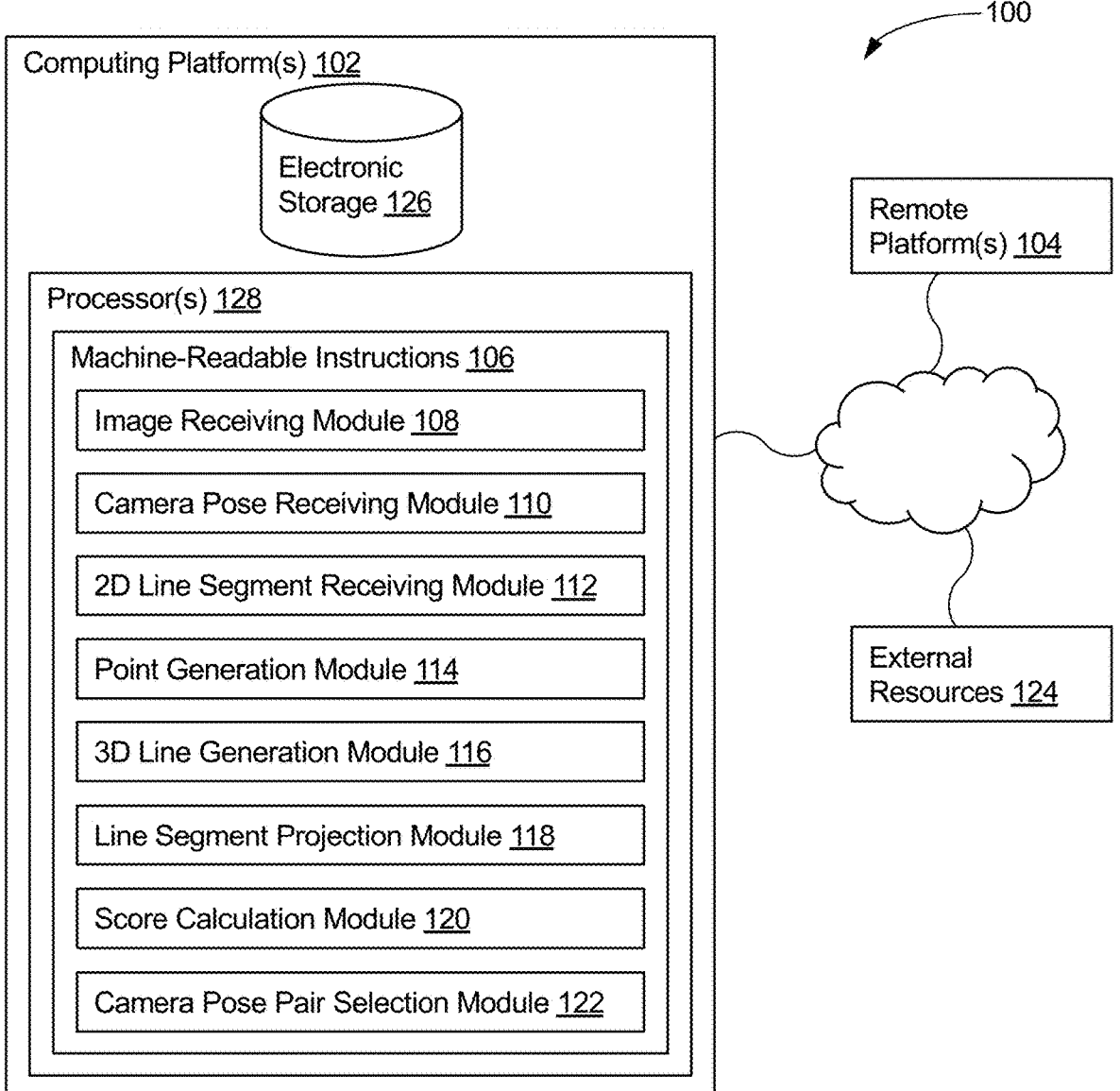
FIG. 1 illustrates a system configured for selecting a pair of consistent real-world camera poses for three-dimensional (3D) reconstruction, in accordance with one or more implementations.

FIG. 1 illustrates a system 100 configured for selecting a pair of consistent real-world camera poses for three-dimensional (3D) reconstruction, in accordance with one or more implementations. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of image receiving module 108, camera pose receiving module 110, 2D line segment receiving module 112, point generation module 114, 3D line generation module 116, line segment projection module 118, score calculation module 120, camera pose pair selection module 122 and/or other instruction modules.

Image receiving module 108 may be configured to receive a plurality of images. Camera pose receiving module 110 may receive a plurality of camera poses. The plurality of camera poses are associated with the plurality of images. Each camera pose may include a camera orientation and a camera location. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like.

2D line segment receiving module 112 may be configured to receive, for each image of the plurality of images, a 2D line segment. The 2D line segments of the plurality of images may correspond to one another. In some embodiments, the 2D line segments may include vertical line segments. In some embodiments, the vertical line segments are perpendicular to a ground plane. The 2D line segments may be image markups. The 2D line segments may be detected using one or more computer vision techniques such as, for example, line detection. The 2D line segments may be provided by user input.

Point generation module 114 may be configured to generate a first point based at least in part on a first 2D line segment of a first image of a pair of images, a second 2D line segment of a second image of the pair of images, a first camera location of the first image of the pair of images, and a second camera location of the second image of the pair of images. In some embodiments, point generation module 114 may be configured to generate the first point by projecting a second point of the first 2D line segment onto a ground plane, projecting a third point of the second 2D line segment onto the ground plane, projecting the first camera location onto the ground plane, projecting the second camera location onto the ground plane, and calculating the first point based on an intersection of a first ray connecting the projected first camera location and the projected second point and a second ray connecting the projected second camera location and the projected third point. In some embodiments, the second point of the first 2D line segment is a first 2D end point of the first 2D line segment, and the third point of the second 2D line segment is a third 2D end point of the second 2D line segment, where the first 2D end point corresponds to the third 2D end point.

3D line generation module 116 may be configured to generate a first 3D line based on the first point. The first 3D line may include the first point. In some embodiments, the first 3D line may be orthogonal to a ground plane.

Line segment projection module 118 may be configured to project 2D line segments onto the first 3D line segment to generate projected line segments including 3D end points. Line segment projection module 118 may be configured to project the first 2D line segment onto the first 3D line to generate a first projected line segment including a first 3D end point and a second 3D end point. Line segment projection module 118 may be configured to project the second 2D line segment onto the first 3D line to generate a second projected line segment including a third 3D end point and a fourth 3D end point.

Score calculation module 120 may be configured to calculate a score for a pair of camera poses. Score calculation module 120 may be configured to calculate a score for the first camera pose and the second camera pose based at least in part on a difference between a first 3D length of the first projected line segment and a second 3D length of the second projected line segment, and a difference between a point of the first projected line segment and a corresponding point of the second projected line segment. In some embodiments, the score may be a sum of the two differences. In some embodiments, the score may be a weighted sum of the two differences. In some embodiments, score calculation module 120 may be configured to calculate the score further based on a first angle between the first ray and the second ray.

In some embodiments, line segment projection module 118, score calculation module 120, or one or more other modules may be configured to calculate the first 3D length of the first projected line segment, the second 3D length of the second projected line segment, and the difference between the first 3D length of the first projected line segment and the second 3D length of the second projected line segment.

In some embodiments, line segment projection module 118, score calculation module 120, or one or more other modules may be configured to calculate the difference between the point of the first projected line segment and the corresponding point of the second projected line segment.

In some embodiments, the point of the first projected line segment may be the first 3D end point of the first projected line segment, and the corresponding point of the second projected line segment may be the third 3D end point of the second projected line segment. In some embodiments, the difference between the point of the first projected line segment and the corresponding point of the second projected line segment is a difference between the first 3D end point of the first projected line segment and the third 3D end point of the second projected line segment.

In some embodiments, the point of the first projected line segment may be the second 3D end point of the first projected line segment, and the corresponding point of the second projected line segment may be the fourth 3D end point of the second projected line segment. In some embodiments, the difference between the point of the first projected line segment and the corresponding point of the second projected line segment is a difference between the second 3D end point of the first projected line segment and the fourth 3D end point of the second projected line segment.

Camera pose pair selection module 122 may be configured to select a pair of camera poses of pairs of camera poses associated with a smallest score. The selected pair of camera poses may correspond to a most consistent pair of camera poses of the plurality of camera poses.

In some embodiments, one or more modules, such as 3D line generation module 116, may be configured to generate a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. In some embodiments, one or more modules may be configured to scale a 3D building model based on the selected pair of camera poses and according to the generated dimensional value of the generated 3D line segment.

In some implementations, computing platform(s) 102, remote platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 124 may be operatively linked via some other communication media.

A given remote platform 104 may include one or more processors configured to execute computer program modules. The computer program modules may be configured to enable an expert or user associated with the given remote platform 104 to interface with system 100 and/or external resources 124, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Computing platform(s) 102 may include electronic storage 126, one or more processors 128, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 126 may comprise non-transitory storage media that electronically stores information. The electronic storage media of electronic storage 126 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from computing platform(s) 102, information received from remote platform(s) 104, and/or other information that enables computing platform(s) 102 to function as described herein.

Processor(s) 128 may be configured to provide information processing capabilities in computing platform(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units.

These processing units may be physically located within the same device, or processor(s) 128 may represent processing functionality of a plurality of devices operating in coordination. Processor(s) 128 may be configured to execute modules 108, 110, 112, 114, 116, 118, 120, and/or 122 and/or other modules. Processor(s) 128 may be configured to execute modules 108, 110, 112, 114, 116, 118, 120, and/or 122 and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, and/or 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

Figure 2:
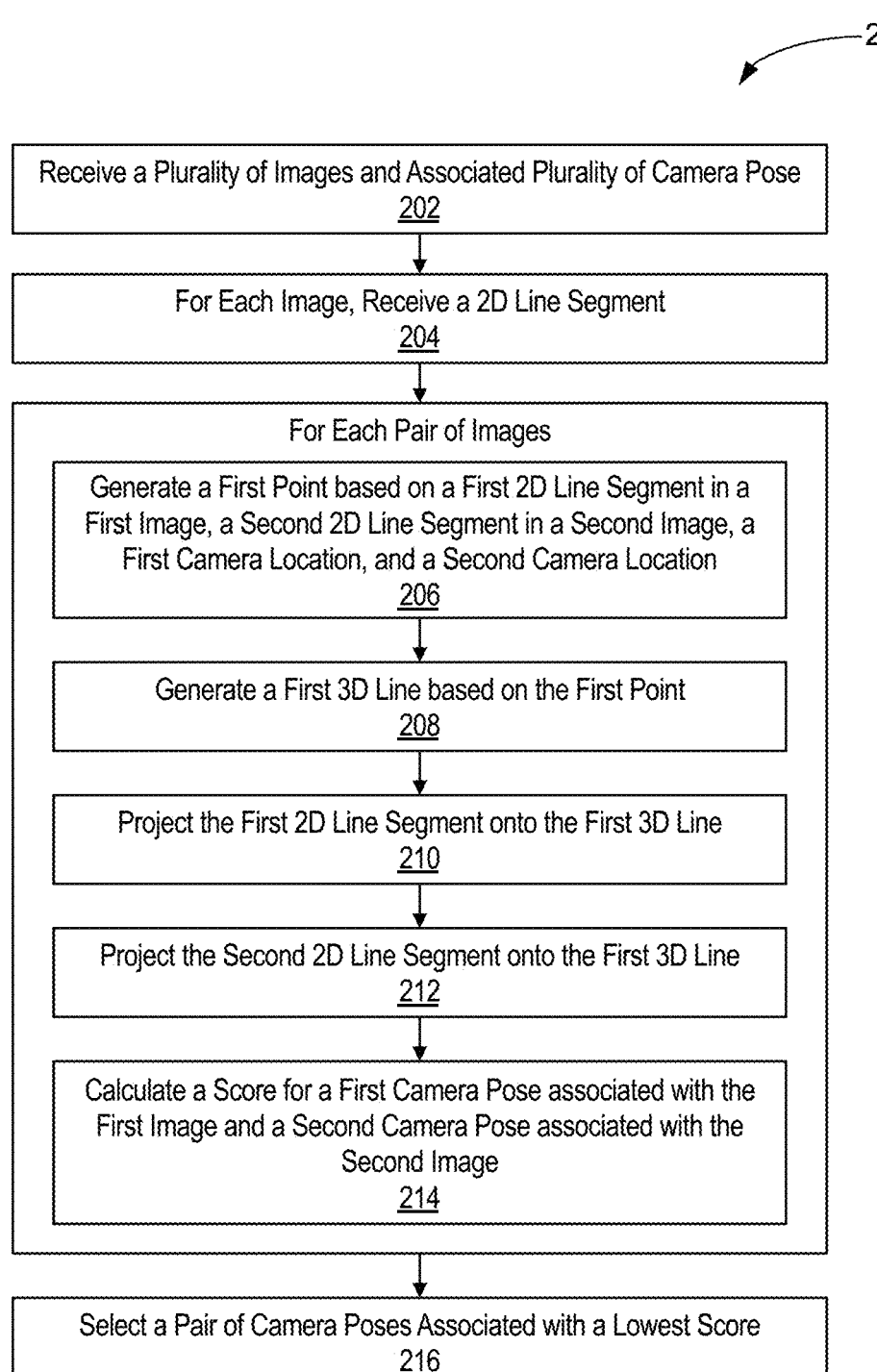
FIG. 2 illustrates a method for selecting a pair of consistent real-world camera poses for 3D reconstruction, in accordance with one or more implementations.

FIG. 2 illustrates a method 200 for selecting a pair of consistent real-world camera poses for 3D reconstruction, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a plurality of images and an associated plurality of camera poses. The plurality of camera poses are associated with the plurality of images. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like. Operation 202 may be performed by one or more hardware processors configured by machine-readable instructions including a module that is the same as or similar to image receiving module 108 and camera pose receiving module 110, in accordance with one or more implementations.

An operation 204 may include, for each image of the plurality of images, receiving a 2D line segment. The 2D line segments of the plurality of images may correspond to one another. In some embodiments, the 2D line segments may include vertical line segments. In some embodiments, the vertical line segments are perpendicular to a ground plane. The 2D line segments may be image markups. The 2D line segments may be detected using one or more computer vision techniques such as, for example, line detection. The 2D line segments may be provided by user input. Operation 204 may be performed by one or more hardware processors configured by machine-readable instructions including a module that is the same as or similar to 2D line segment receiving module 112, in accordance with one or more implementations.

Operations 206 through 214 may be performed for each pair of images of the plurality of images.

An operation 206 may include generating a first point based at least in part on a first 2D line segment of a first image of a pair of images, a second 2D line segment of a second image of the pair of images, a first camera location of the first image of the pair of images, and a second camera location of the second image of the pair of images. In some embodiments, generating the first point may include projecting a second point of the first 2D line segment onto a ground plane, projecting a third point of the second 2D line segment onto the ground plane, projecting the first camera location onto the ground plane, projecting the second camera location onto the ground plane, and calculating the first point based on an intersection of a first ray connecting the projected first camera location and the projected second point and a second ray connecting the projected second camera location and the projected third point. In some embodiments, the second point of the first 2D line segment is a first 2D end point of the first 2D line segment, and the third point of the second 2D line segment is a third 2D end point of the second 2D line segment, where the first 2D end point corresponds to the third 2D end point. Operation 210 may be performed by one or more hardware processors configured by machine-readable instructions including a module that is the same as or similar to point generation module 112, in accordance with one or more implementations.

An operation 208 may include generating a first 3D line based on the first point. The first 3D line may include the first point. In some embodiments, the first 3D line may be orthogonal to a ground plane. Operation 212 may be performed by one or more hardware processors configured by machine-readable instructions including a module that is the same as or similar to line 3D line generation module 116, in accordance with one or more implementations.

An operation 210 may include projecting the first 2D line segment onto the first 3D line to generate a first projected line segment including a first 3D end point and a second 3D end point. Operation 210 may be performed by one or more hardware processors configured by machine-readable instructions including a module that is the same as or similar to line segment projection module 118, in accordance with one or more implementations.

An operation 212 may include projecting the second 2D line segment onto the first 3D line to generate a second projected line segment including a third 3D end point and a fourth 3D end point. Operation 212 may be performed by one or more hardware processors configured by machine-readable instructions including a module that is the same as or similar to line segment projection module 118, in accordance with one or more implementations.

An operation 214 may include calculating a score for a first camera pose associated with the first image and a second camera pose associated with the second image. Calculating the score may be based at least in part on a difference between a first 3D length of the first projected line segment and a second 3D length of the second projected line segment, and a difference between a point of the first projected line segment and a corresponding point of the second projected line segment. In some embodiments, the score may be a sum of the two differences. In some embodiments, the score may be a weighted sum of the two differences. In some embodiments, calculating the score may further be based on a first angle between the first ray and the second ray. Operation 214 may be performed by one or more hardware processors configured by machine-readable instructions including a module that is the same as or similar to score calculation module 120, in accordance with one or more implementations.

In some embodiments, operation 210, operation 214, or one or more other operations may include calculating the first 3D length of the first projected line segment. In some embodiments, operation 212, operation 214, or one or more other operations may include calculating the second 3D length of the second projected line segment. In some embodiments, operation 214 or one or more other operations may include calculating the difference between the first 3D length of the first projected line segment and the second 3D length of the second projected line segment.

In some embodiments, operation 214 or one or more other operations may include calculating the difference between the point of the first projected line segment and the corresponding point of the second projected line segment.

In some embodiments, the point of the first projected line segment may be the first 3D end point of the first projected line segment, and the corresponding point of the second projected line segment may be the third 3D end point of the second projected line segment. In some embodiments, the difference between the point of the first projected line segment and the corresponding point of the second projected line segment is a difference between the first 3D end point of the first projected line segment and the third 3D end point of the second projected line segment.

In some embodiments, the point of the first projected line segment may be the second 3D end point of the first projected line segment, and the corresponding point of the second projected line segment may be the fourth 3D end point of the second projected line segment. In some embodiments, the difference between the point of the first projected line segment and the corresponding point of the second projected line segment is a difference between the second 3D end point of the first projected line segment and the fourth 3D end point of the second projected line segment.

An operation 216 may include selecting a pair of camera poses of pairs of camera poses associated with a smallest score. The selected pair of camera poses may correspond to a most consistent pair of camera poses of the plurality of camera poses. Operation 216 may be performed by one or more hardware processors configured by machine-readable instructions including a module that is the same as or similar to camera pose pair selection module 122, in accordance with one or more implementations.

In some embodiments, method 200 may further include generating a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. These operations may be performed by one or more hardware processors configured by machine-readable instructions including a module that is the same as or similar to 3D line segment generation module 116, in accordance with one or more implementations. In some embodiments, method 200 may further include scaling a 3D building model based on the selected pair of camera poses and according to the generated dimensional value of the generated 3D line segment.

FIGS. 3-7 are exemplary illustrations of calculating a score for a pair of camera poses, in accordance with one or more implementations.

FIG. 3 illustrates first image 302 and associated first camera pose 304, and second image 306 and associated second camera pose 308. First image 302 includes first 2D line segment 312 and second image 306 includes second 2D line segment 322. First 2D line segment 312 and second 2D line segment 322 correspond to one another. First line segment 312 includes first 2D end point 314 and second 2D end point 316 and second 2D line segment 322 includes third 2D end point 324 and fourth 2D end point 326. First 2D end point 314 corresponds to third 2D end point 324 and second 2D end point 316 corresponds to fourth 2D end point 326.

Figure 4:
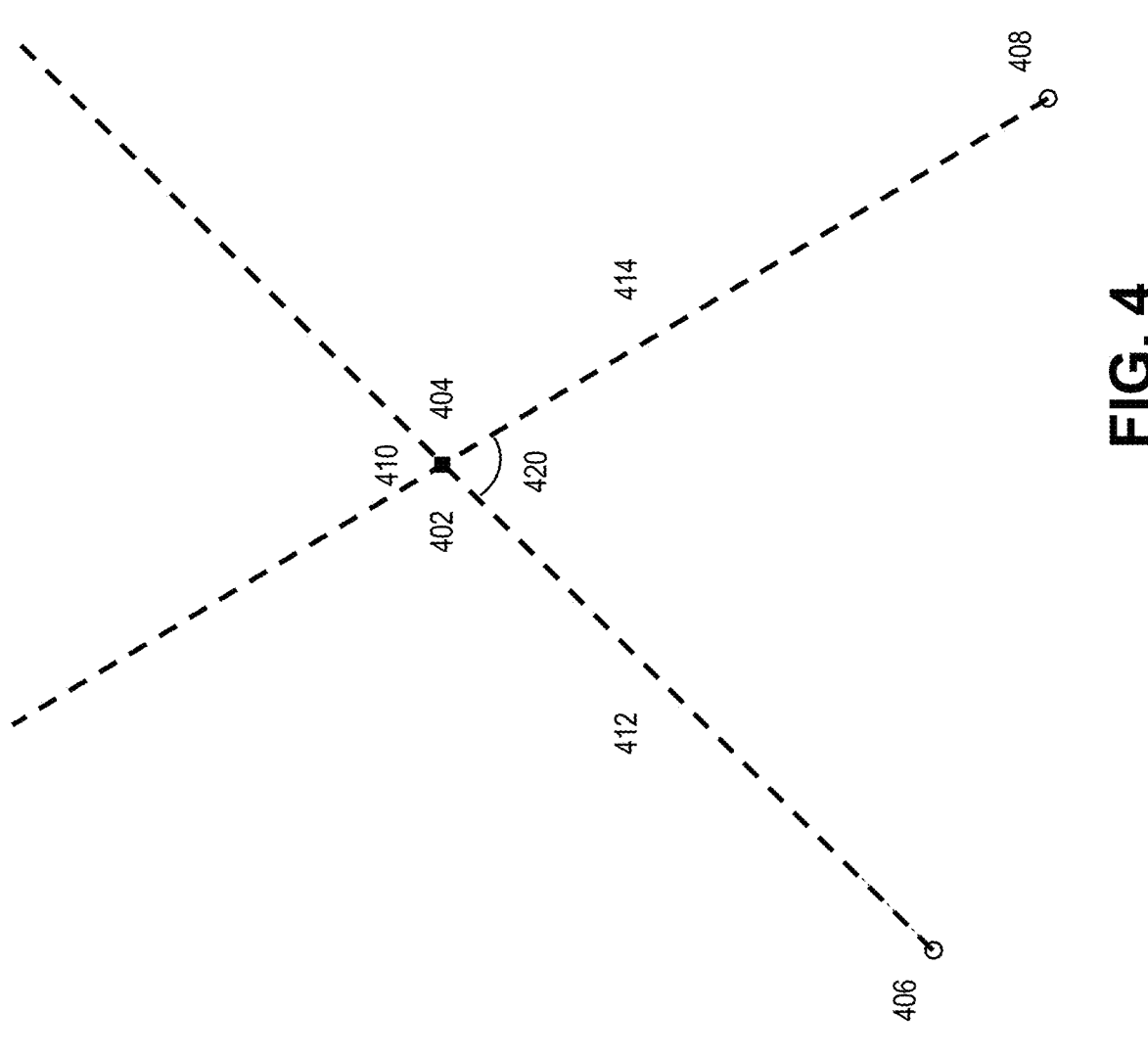

FIG. 4 illustrates ground plane 400, projected second point 402 of first 2D line segment 312, projected third point 404 of second 2D line segment 322, projected first camera location 406 of first camera pose 304, and projected second camera location 408 of second camera pose 308. In this example, projected second point 402 and projected third point 404 are illustrated as being in the same position on ground plane 400. One of ordinary skill in the art will appreciate that in other examples projected points 402 and 404 may not be in the same position on ground plane 400. In some embodiments, projected second point 402 may be first 2D end point 314 projected onto ground plane 400 and projected third point 404 may be third 2D end point 324 projected onto ground plane 400. In some embodiments, projected second point 402 may be second 2D end point 316 projected onto ground plane 400 and projected third point 404 may be fourth 2D end point 326 projected onto ground plane 400. First point 410 is calculated based on an intersection of first ray 412 connecting projected first camera location 406 and projected second point 402 and second ray 414 connecting projected second camera location 408 and projected third point 404.

FIG. 5 illustrates 3D line 500 generated based on first point 410.

Figure 6:
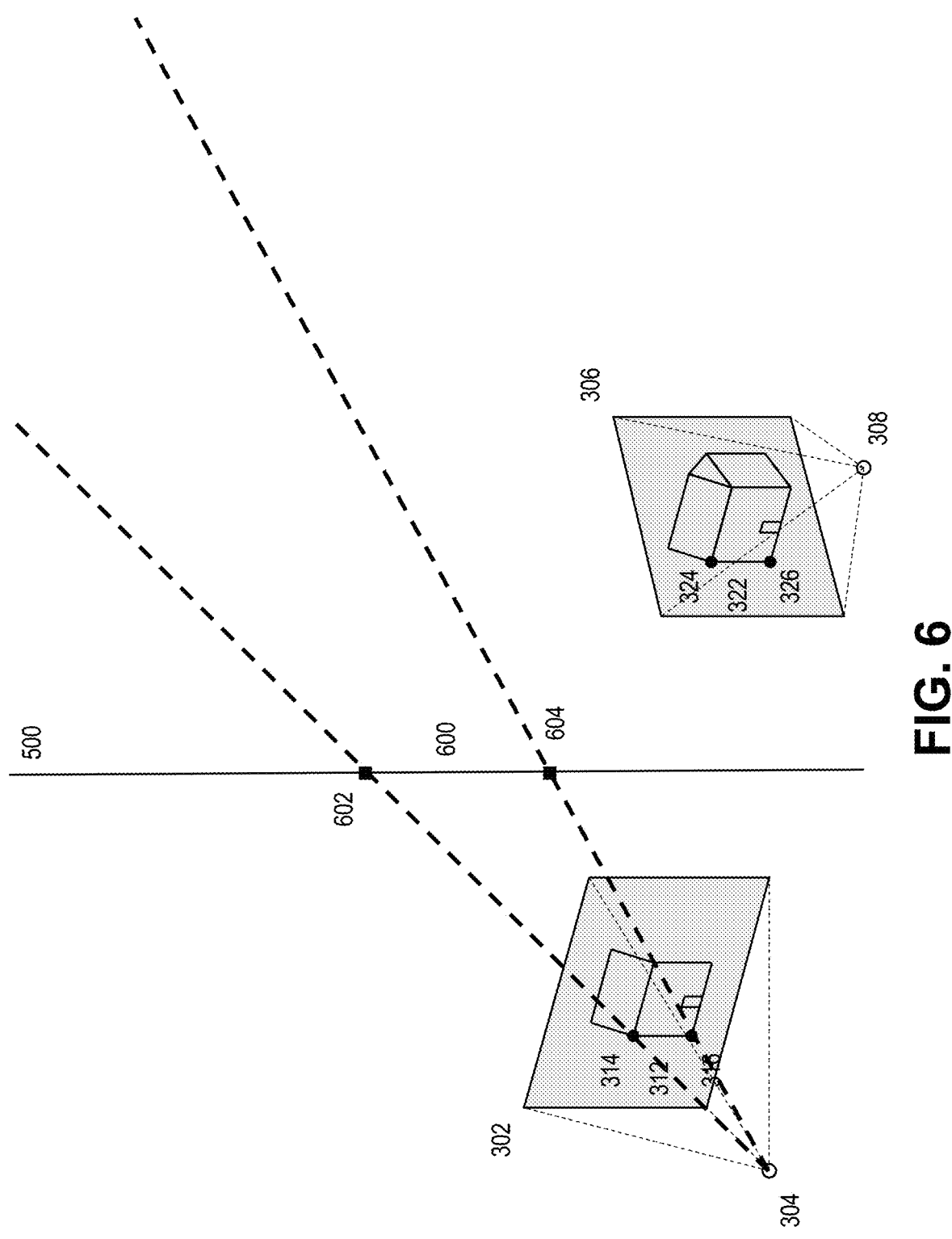
Figure 7:
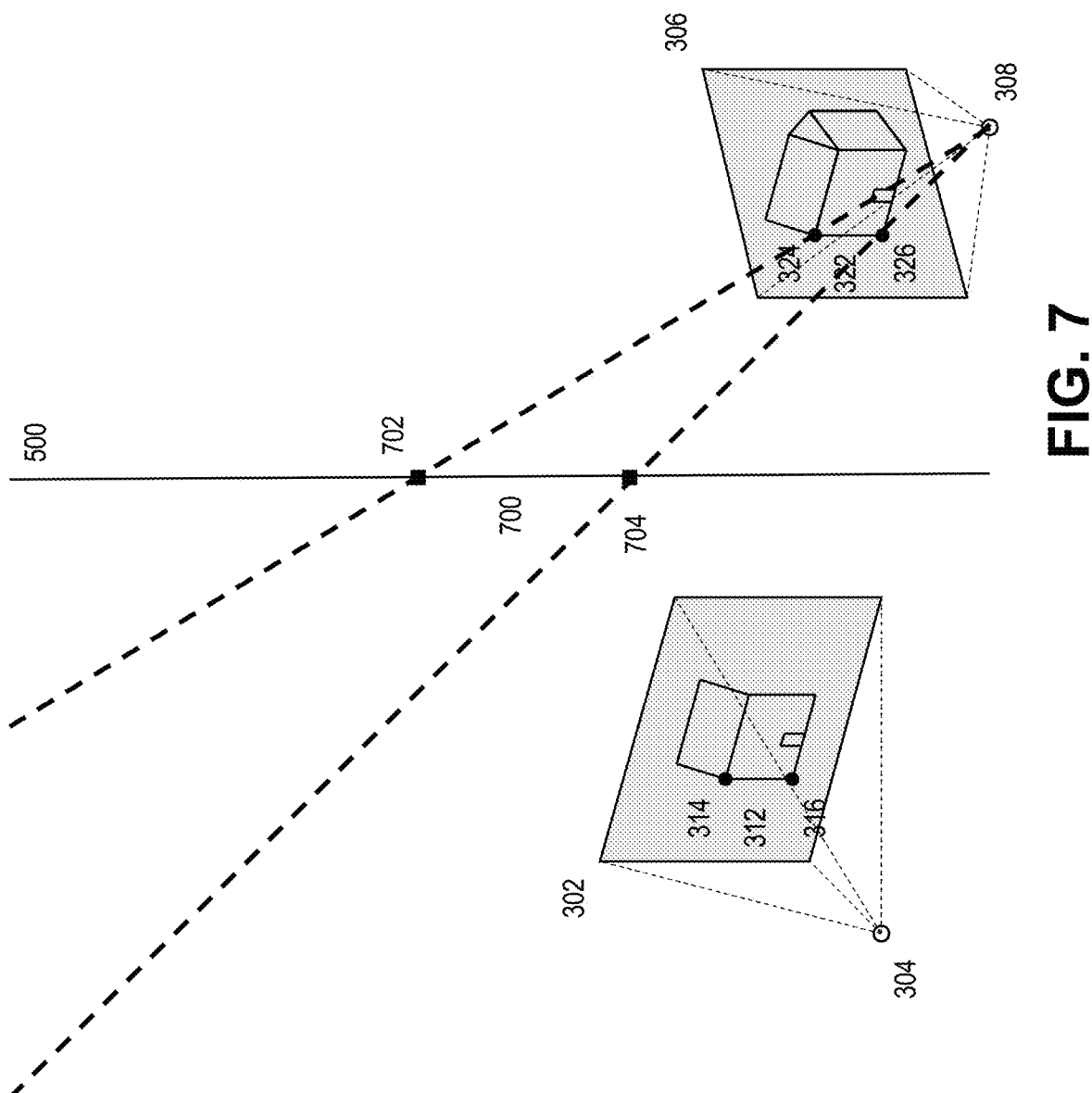

FIG. 6 illustrates first 2D line segment 312 projected onto first 3D line 500 which generates first projected line segment 600. First projected line segment 600 includes first 3D end point 602 and second 3D end point 604. FIG. 7 illustrates second 2D line segment 322 projected onto first 3D line 500 which generates second projected line segment 700. Second projected line segment 700 includes third 3D end point 702 and fourth 3D end point 704.

A score for camera pose pair 304 and 308 may be calculated based at least in part on a difference between a first 3D length of first projected line segment 600 and a second 3D length of the second projected line segment 700, and a difference between a point of first projected line segment 600 and a corresponding point of second projected line segment 700. In some embodiments, the score may be a sum of the two differences. In some embodiments, the score may be a weighted sum of the two differences. In some embodiments, the score may be calculated further based on an angle between first ray 412 and second ray 414.

In some embodiments, the point of first projected line segment 600 may be first 3D end point 602, and the corresponding point of second projected line segment 700 may be third 3D end point 702. In some embodiments, the difference between the point of first projected line segment 600 and the corresponding point of second projected line segment 700 is a difference between first 3D end point 602 and third 3D end point 702.

In some embodiments, the point of first projected line segment 600 may be second 3D end point 604, and the corresponding point of second projected line segment 700 may be fourth 3D end point 704. In some embodiments, the difference between the point of first projected line segment 600 and the corresponding point of second projected line segment 700 is a difference between second 3D end point 604 and fourth 3D end point 704.

Figure 8:
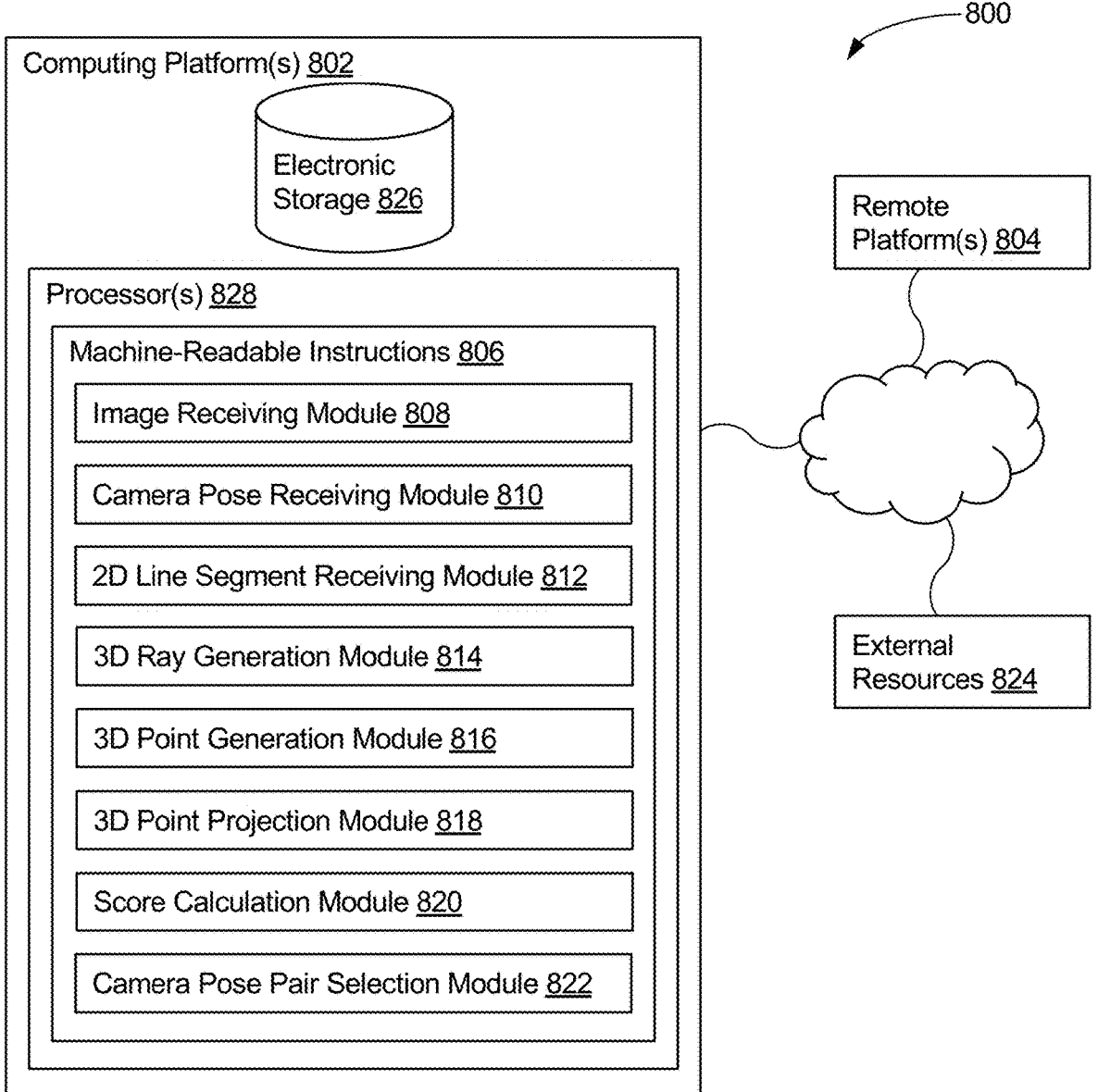
FIG. 8 illustrates a system configured for selecting a pair of consistent real-world camera poses for three-dimensional reconstruction, in accordance with one or more implementations.
Figure 10A:
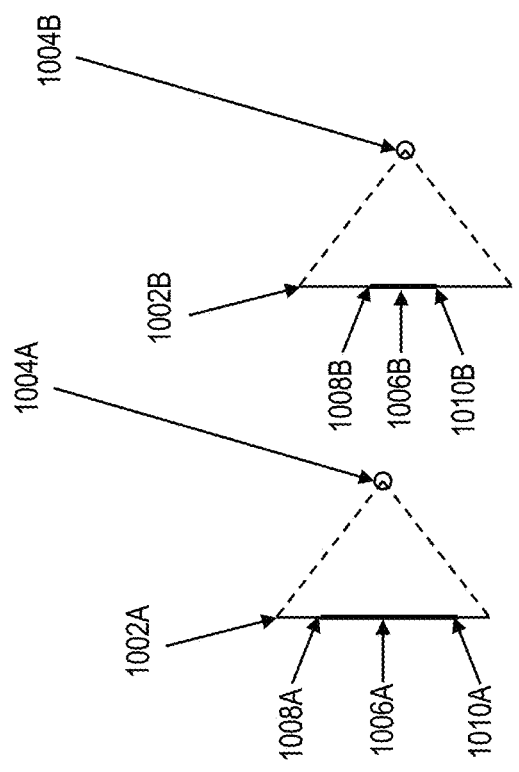
FIGS. 10A-10D illustrate calculating a score for a pair of camera poses, in accordance with one or more implementations.
Figure 10B:
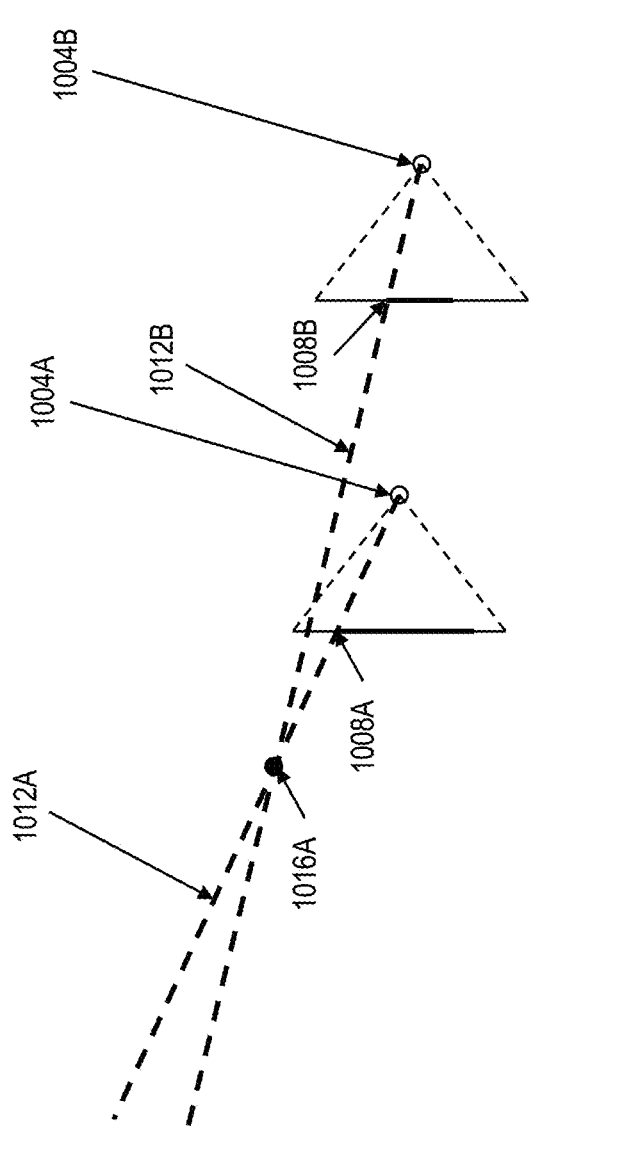
Figure 10C:
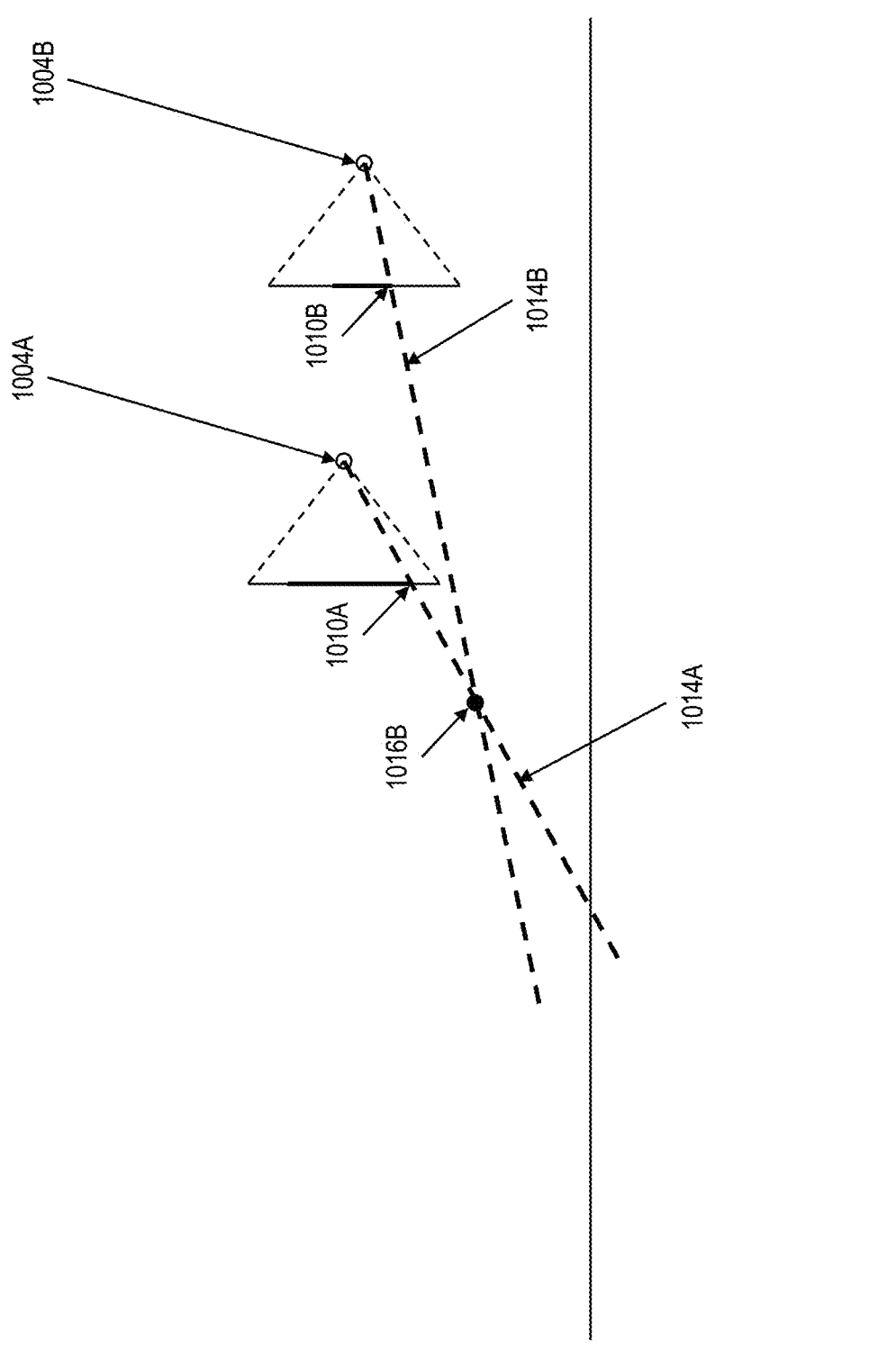
Figure 10D:
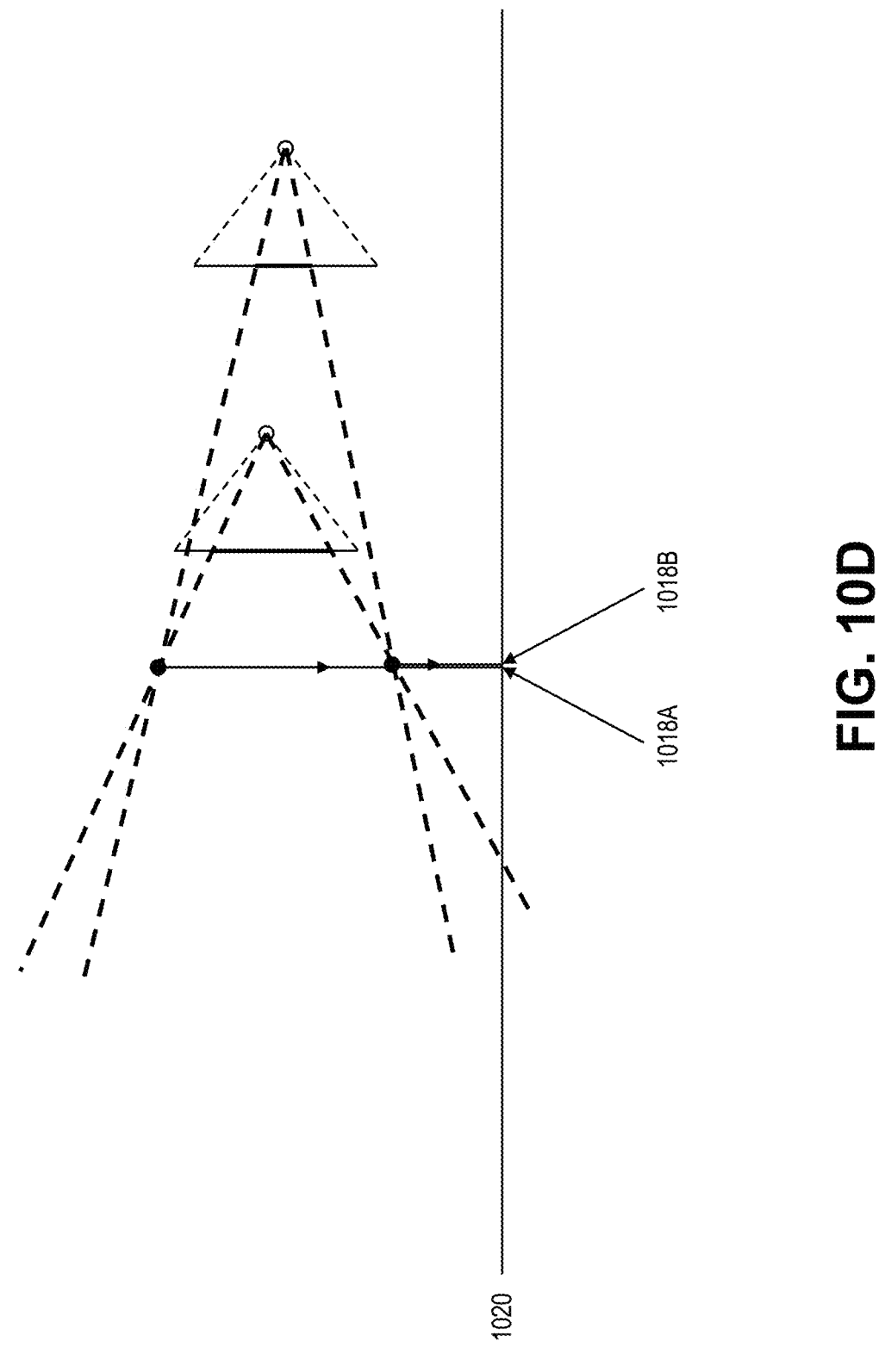

FIG. 8 illustrates a system 800 configured for selecting a pair of consistent real-world camera poses for three-dimensional reconstruction, in accordance with one or more implementations. In some implementations, system 800 may include one or more computing platforms 802. Computing platform(s) 802 may be configured to communicate with one or more remote platforms 804 according to a client/server architecture, a peer-to-peer architecture, and/or other architectures. Remote platform(s) 804 may be configured to communicate with other remote platforms via computing platform(s) 802 and/or according to a client/server architecture, a peer-to-peer architecture, and/or other architectures. Users may access system 800 via remote platform(s) 804.

Computing platform(s) 802 may be configured by machine-readable instructions 806. Machine-readable instructions 806 may include one or more instruction modules. The instruction modules may include computer program modules. The instruction modules may include one or more of image receiving module 808, camera pose receiving module 810, 2D line segment receiving module 812, 3D ray generation module 814, 3D point generation module 816, 3D point projection module 818, score calculation module 820, camera pose pair selection module 822, and/or other instruction modules.

Image receiving module 808 may be configured to receive a plurality of images. Camera pose receiving module 810 may receive a plurality of camera poses. The plurality of camera poses are associated with the plurality of images. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like.

2D line segment receiving module 812 may be configured to receive, for each image of the plurality of images, a 2D line segment. The 2D line segments of the plurality of images may correspond to one another. In some embodiments, the 2D line segments may include vertical line segments. In some embodiments, the vertical line segments are perpendicular to a ground plane. The 2D line segments may be image markups. The 2D line segments may be detected using one or more computer vision techniques such as, for example, line detection. The 2D line segments may be provided by user input.

3D ray generation module 814 may be configured to generate 3D rays based on camera poses and 2D end points of line segments. In some embodiments, 3D ray generation module 814 may be configured to generate a first 3D ray based at least in part on a first camera pose of a first image of a pair of images and a first 2D end point of a first 2D line segment of the first image of the pair of images. In some embodiments, 3D ray generation module 814 may be configured to generate a second 3D ray based at least in part on a second camera pose of a second image of the pair of images and a third 2D end point of a second 2D line segment of the second image of the pair of images. In some embodiments, 3D ray generation module 814 may be configured to generate a third 3D ray based at least in part on the first camera pose and a second 2D end point of the first 2D line segment. In some embodiments, 3D ray generation module 814 may be configured to generate a fourth 3D ray based at least in part on the second camera pose and a fourth 2D end point of the second 2D line segment. The first 2D end point of the first 2D line segment may correspond to the third 2D end point of the second 2D line segment, and the second 2D end point of the first 2D line segment may correspond to the fourth 2D end point of the second 2D line segment. In some embodiments, a first angle between the first 3D ray and the second 3D ray is at least a first threshold number of degrees, for example ten degrees. In some embodiments, a second angle between the third 3D ray and the fourth 3D ray is at least a second threshold number of degrees, for example ten degrees. In some embodiments, a distance between the first camera pose and the second camera pose is at least a first threshold distance, for example ten inches.

3D point generation module 816 may be configured to generate a 3D point based on intersections of 3D rays. In some embodiments, 3D point generation module 816 may be configured to generate a first 3D point based on an intersection of the first 3D ray and the second 3D ray. In some embodiments, 3D point generation module 816 may be configured to generate a second 3D point based on an intersection of the third 3D ray and the fourth 3D ray.

3D point projection module 818 may be configured to project the first and second 3D points onto a plane to generate first and second projected points. In some embodiments, the plane may be a ground plane.

Score calculation module 820 may be configured to calculate a score for the first camera pose and the second camera pose based on a difference between a position of the first projected point and a position of the second projected point. In some embodiments, the score is directly related to the difference. In some embodiments, the smaller the difference between the position of the first projected point and the position of the second projected point, the more consistent the first and second camera pose are with respect to one another. In some embodiments, score calculation module 820 may be configured to calculate the score for the first camera pose and the second camera pose further based on the first angle between the first 3D ray and the second 3D ray. In some embodiments, score calculation module 820 may be configured to calculate the score for the first camera pose and the second camera pose further based on the second angle between the third 3D ray and the fourth 3D ray. In some embodiments, score calculation module 820 may be configured to calculate the score for the first camera pose and the second camera pose further based on a distance between the first camera pose and the second camera pose.

In some embodiments, one or more modules may be configured to generate a first 3D line segment, where a first 3D end point of the first 3D line segment is the first 3D point and a second 3D end point of the first 3D line segment is the second 3D point. In some embodiments, one or more modules may be configured to project the first 3D line segment onto the first image to generate a first projected line segment, and project the first 3D line segment onto the second image to generate a second projected line segment. In some embodiments, score calculation module 820 may be configured to calculate the score for the first camera pose and the second camera pose further based on a reprojection error between the first 2D line segment and the first projected line segment, and a reprojection error between the second 2D line segment and the second projected line segment.

Camera pose pair selection module 822 may be configured to select a pair of camera poses of pairs of camera poses associated with a smallest score. The selected pair of camera poses may correspond to a most consistent pair of camera poses of the plurality of camera poses.

In some embodiments, one or more modules may be configured to generate a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. In some embodiments, one or more modules may be configured to scale a 3D building model based on the selected pair of camera poses and according to the generated dimensional value of the generated 3D line segment.

In some implementations, computing platform(s) 802, remote platform(s) 804, and/or external resources 824 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 802, remote platform(s) 804, and/or external resources 824 may be operatively linked via some other communication media.

A given remote platform 804 may include one or more processors configured to execute computer program modules. The computer program modules may be configured to enable an expert or user associated with the given remote platform 804 to interface with system 800 and/or external resources 824, and/or provide other functionality attributed herein to remote platform(s) 804. By way of non-limiting example, a given remote platform 804 and/or a given computing platform 802 may include one or more of a server, a desktop computer, a laptop computer, a handheld computer, a tablet computing platform, a NetBook, a Smartphone, a gaming console, and/or other computing platforms.

External resources 824 may include sources of information outside of system 800, external entities participating with system 800, and/or other resources. In some implementations, some or all of the functionality attributed herein to external resources 824 may be provided by resources included in system 800.

Computing platform(s) 802 may include electronic storage 826, one or more processors 828, and/or other components. Computing platform(s) 802 may include communication lines, or ports to enable the exchange of information with a network and/or other computing platforms. Illustration of computing platform(s) 802 in FIG. 8 is not intended to be limiting. Computing platform(s) 802 may include a plurality of hardware, software, and/or firmware components operating together to provide the functionality attributed herein to computing platform(s) 802. For example, computing platform(s) 802 may be implemented by a cloud of computing platforms operating together as computing platform(s) 802.

Electronic storage 826 may comprise non-transitory storage media that electronically stores information. The electronic storage media of electronic storage 826 may include one or both of system storage that is provided integrally (i.e., substantially non-removable) with computing platform(s) 802 and/or removable storage that is removably connectable to computing platform(s) 802 via, for example, a port (e.g., a USB port, a firewire port, etc.) or a drive (e.g., a disk drive, etc.). Electronic storage 826 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 826 may include one or more virtual storage resources (e.g., cloud storage, a virtual private network, and/or other virtual storage resources). Electronic storage 826 may store software algorithms, information determined by processor(s) 828, information received from computing platform(s) 802, information received from remote platform(s) 804, and/or other information that enables computing platform(s) 802 to function as described herein.

Processor(s) 828 may be configured to provide information processing capabilities in computing platform(s) 802. As such, processor(s) 828 may include one or more of a digital processor, an analog processor, a digital circuit designed to process information, an analog circuit designed to process information, a state machine, and/or other mechanisms for electronically processing information. Although processor(s) 828 is shown in FIG. 8 as a single entity, this is for illustrative purposes only. In some implementations, processor(s) 828 may include a plurality of processing units. These processing units may be physically located within the same device, or processor(s) 828 may represent processing functionality of a plurality of devices operating in coordination. Processor(s) 828 may be configured to execute modules 808, 810, 812, 814, 816, 818, 820, and/or 822, and/or other modules. Processor(s) 828 may be configured to execute modules 808, 810, 812, 814, 816, 818, 820, and/or 822, and/or other modules by software; hardware; firmware; some combination of software, hardware, and/or firmware; and/or other mechanisms for configuring processing capabilities on processor(s) 828. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 808, 810, 812, 814, 816, 818, 820, and/or 822 are illustrated in FIG. 8 as being implemented within a single processing unit, in implementations in which processor(s) 828 includes multiple processing units, one or more of modules 808, 810, 812, 814, 816, 818, 820, and/or 822 may be implemented remotely from the other modules. The description of the functionality provided by the different modules 808, 810, 812, 814, 816, 818, 820, and/or 822 described below is for illustrative purposes, and is not intended to be limiting, as any of modules 808, 810, 812, 814, 816, 818, 820, and/or 822 may provide more or less functionality than is described. For example, one or more of modules 808, 810, 812, 814, 816, 818, 820, and/or 822 may be eliminated, and some or all of its functionality may be provided by other ones of modules 808, 810, 812, 814, 816, 818, 820, and/or 822. As another example, processor(s) 828 may be configured to execute one or more additional modules that may perform some or all of the functionality attributed below to one of modules 808, 810, 812, 814, 816, 818, 820, and/or 822.

FIG. 9 illustrates a method 900 for selecting a pair of consistent real-world camera poses for three-dimensional reconstruction, in accordance with one or more implementations. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

An operation 902 may include receiving a plurality of images and an associated plurality of camera poses. The plurality of camera poses are associated with the plurality of images. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like. Operation 902 may be performed by one or more hardware processors configured by machine-readable instructions including a module that is the same as or similar to image receiving module 808 and camera pose receiving module 810, in accordance with one or more implementations.

An operation 904 may include, for each image of the plurality of images, receiving a 2D line segment. The 2D line segments of the plurality of images may correspond to one another. In some embodiments, the 2D line segments may include vertical line segments. In some embodiments, the vertical line segments are perpendicular to a ground plane. The 2D line segments may be image markups. The 2D line segments may be detected using one or more computer vision techniques such as, for example, line detection. The 2D line segments may be provided by user input. Operation 904 may be performed by one or more hardware processors configured by machine-readable instructions including a module that is the same as or similar to 2D line segment receiving module 812, in accordance with one or more implementations.

Operations 906 through 920 may be performed for each pair of images of the plurality of images.

An operation 906 may include generating a first 3D ray based at least in part on a first camera pose of a first image of a pair of images and a first 2D end point of a first 2D line segment of the first image of the pair of images. An operation 908 may include generating a second 3D ray based at least in part on a second camera pose of a second image of the pair of images and a third 2D end point of a second 2D line segment of the second image of the pair of images. An operation 910 may include generating a third 3D ray based at least in part on the first camera pose and a second 2D end point of the first 2D line segment. An operation 912 may include generating a fourth 3D ray based at least in part on the second camera pose and a fourth 2D end point of the second 2D line segment. The first 2D end point of the first 2D line segment may correspond to the third 2D end point of the second 2D line segment, and the second 2D end point of the first 2D line segment may correspond to the fourth 2D end point of the second 2D line segment. In some embodiments, a first angle between the first 3D ray and the second 3D ray is at least a first threshold number of degrees, for example ten degrees. In some embodiments, a second angle between the third 3D ray and the fourth 3D ray is at least a second threshold number of degrees, for example ten degrees. In some embodiments, a distance between the first camera pose and the second camera pose is at least a first threshold distance, for example ten inches. Operations 906 through 912 may be performed by one or more hardware processors configured by machine-readable instructions including a module that is the same as or similar to 3D ray generation module 814, in accordance with one or more implementations.

An operation 914 may include generating a first 3D point based on an intersection of the first 3D ray and the second 3D ray. An operation 916 may include generating a second 3D point based on an intersection of the third 3D ray and the fourth 3D ray. Operations 914 and 916 may be performed by one or more hardware processors configured by machine-readable instructions including a module that is the same as or similar to 3D point generation module 816, in accordance with one or more implementations.

An operation 918 may include projecting the first and second 3D points onto a plane to generate first and second projected points. In some embodiments, the plane may be a ground plane. Operation 918 may be performed by one or more hardware processors configured by machine-readable instructions including a module that is the same as or similar to 3D point projection module 818, in accordance with one or more implementations.

An operation 920 may include calculating a score for the first camera pose and the second camera pose based on a difference between a position of the first projected point and a position of the second projected point. In some embodiments, the score is directly related to the difference. In some embodiments, the smaller the difference between the position of the first projected point and the position of the second projected point, the more consistent the first and second camera pose are with respect to one another. In some embodiments, operation 920 may include calculating the score for the first camera pose and the second camera pose further based on the first angle between the first 3D ray and the second 3D ray. In some embodiments, operation 920 may include calculating the score for the first camera pose and the second camera pose further based on the second angle between the third 3D ray and the fourth 3D ray. In some embodiments, operation 920 may include calculating the score for the first camera pose and the second camera pose further based on a distance between the first camera pose and the second camera pose. Operation 920 may be performed by one or more hardware processors configured by machine-readable instructions including a module that is the same as or similar to score calculation module 820, in accordance with one or more implementations.

In some embodiments, method 900 may include generating a first 3D line segment, where a first 3D end point of the first 3D line segment is the first 3D point and a second 3D end point of the first 3D line segment is the second 3D point. In some embodiments, method 900 may include projecting the first 3D line segment onto the first image to generate a first projected line segment, and projecting the first 3D line segment onto the second image to generate a second projected line segment. In some embodiments, operation 920 may include calculating the score for the first camera pose and the second camera pose further based on a reprojection error between the first 2D line segment and the first projected line segment, and a reprojection error between the second 2D line segment and the second projected line segment.

An operation 922 may include selecting a pair of camera poses of pairs of camera poses associated with a smallest score. Operation 922 may be performed by one or more hardware processors configured by machine-readable instructions including a module that is the same as or similar to camera pose pair selection module 822, in accordance with one or more implementations.

In some embodiments, method 900 may further include generating a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. These operations may be performed by one or more hardware processors configured by machine-readable instructions including a module that is the same as or similar to 3D line segment generation module 816, in accordance with one or more implementations. In some embodiments, method 900 may further include scaling a 3D building model based on the selected pair of camera poses and according to the generated dimensional value of the generated 3D line segment.

FIGS. 10A-10D illustrate calculating a score for a pair of camera poses, in accordance with one or more implementations. First and second images 1002A and 1002B and associated first and second camera pose 1004A and 1004B may be received. 2D line segment 1006A for first image 1002A may be received and 2D line segment 1006B for second image 1002B may be received. 2D line segment 1006A and 2D line segment 1006B may correspond to one another. 2D line segment 1006A may include first and second 2D end points 1008A and 1010A and 2D line segment 1006B may include third and fourth 2D end points 1008B and 1010B. First 2D end point 1008A may correspond to third 2D end point 1008B, and second 2D end point 1010A may correspond to fourth 2D end point 1010B.

First 3D ray 1012A may be generated based at least in part on first camera pose 1004A and first 2D end point 1008A. Second 3D ray 1012B may be generated based at least in part on second camera pose 1004B and third 2D end point 1008B. Third 3D ray 1014A may be generated based at least in part on first camera pose 1004A and second 2D end point 1010A. Fourth 3D ray 1014B may be generated based at least in part on second camera pose 1004B and fourth 2D end point 1010B.

First 3D point 1016A may be generated based on an intersection of first 3D ray 1012A and second 3D ray 1012B. Second 3D point 1016B may be generated based on an intersection of third 3D ray 1014A and fourth 3D ray 1014B. First and second 3D points 1016A and 1016B may be projected onto plane 1020 to generate first and second projected points 1018A and 1018B.

A score for first and second camera poses 1004A and 1004B may be calculated based on a difference between a position of first projected point 1018A and a position of second projected point 1018B. In some embodiments, calculating the score may further be based on a first angle between first 3D ray 1012A and second 3D ray 1012B. In some embodiments, calculating the score may further be based on a second angle between third 3D ray 1014A and fourth 3D ray 1014B. In some embodiments, calculating the score may further be based on a distance between first camera pose 1004A and second camera pose 1004B. In some embodiments, a first 3D line segment may be generated, where a first 3D end point of the first 3D line segment is first 3D point 1016A and a second 3D end point of the first 3D line segment is second 3D point 1016B. In some embodiments, the first 3D line segment may be projected onto first image 1002A to generate a first projected line segment, and projected onto second image 1002B to generate a second projected line segment. In some embodiments, calculating the score may further be based on a reprojection error between first 2D line segment 1006A and the first projected line segment, and a reprojection error between second 2D line segment 1006B and the second projected line segment.

Figure 11:
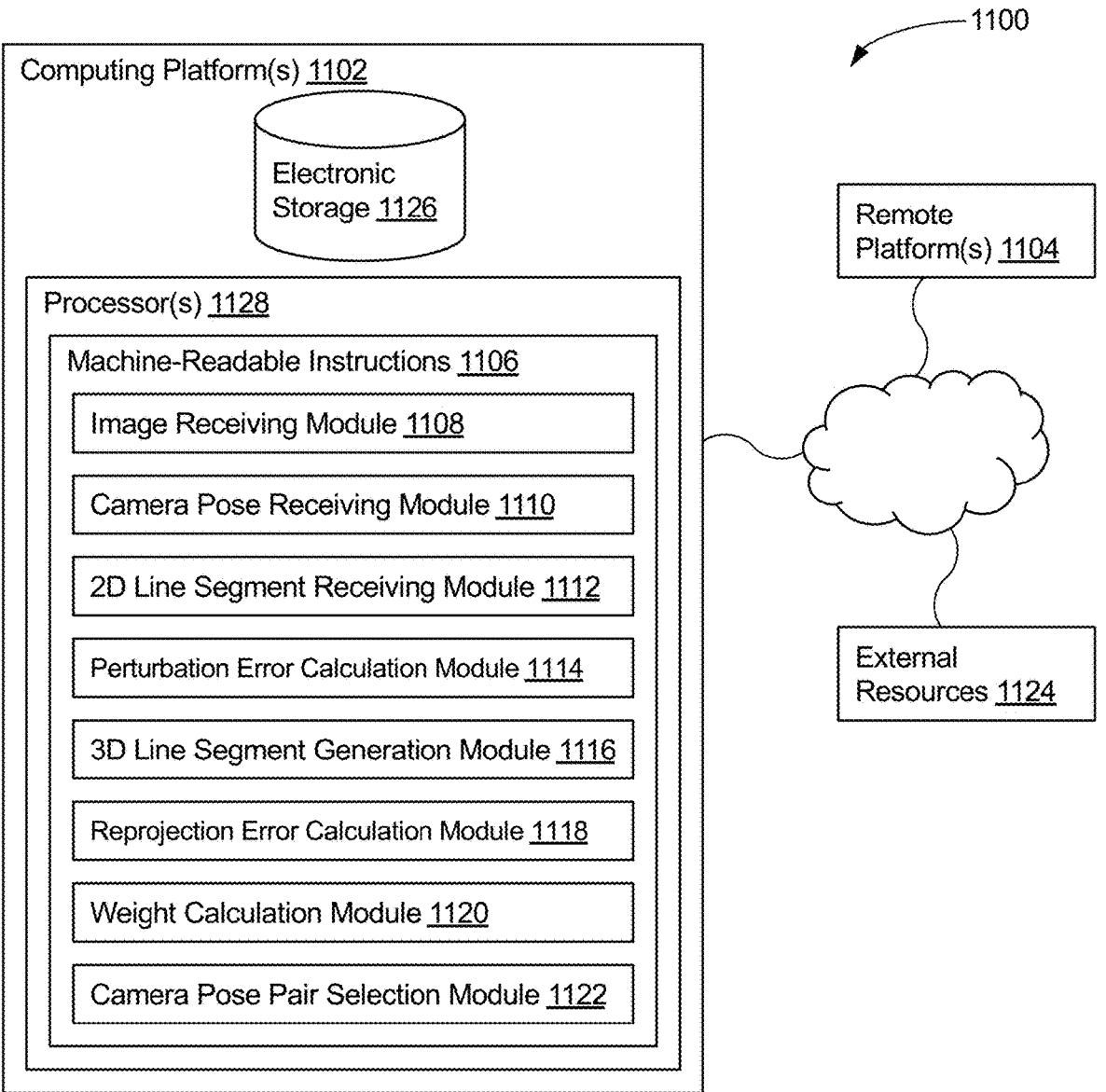
FIG. 11 illustrates a system configured for selecting a pair of consistent real-world camera poses for three-dimensional reconstruction, in accordance with one or more implementations.

FIG. 11 illustrates a system 1100 configured for selecting a pair of consistent real-world camera poses for three-dimensional reconstruction, in accordance with one or more implementations. In some implementations, system 1100 may include one or more computing platforms 1102. Computing platform(s) 1102 may be configured to communicate with one or more remote platforms 1104 according to a client/server architecture, a peer-to-peer architecture, and/or other architectures. Remote platform(s) 1104 may be configured to communicate with other remote platforms via computing platform(s) 1102 and/or according to a client/server architecture, a peer-to-peer architecture, and/or other architectures. Users may access system 1100 via remote platform(s) 1104.

Computing platform(s) 1102 may be configured by machine-readable instructions 1106. Machine-readable instructions 1106 may include one or more instruction modules. The instruction modules may include computer program modules. The instruction modules may include one or more of image receiving module 1108, camera pose receiving module 1110, 2D line segment receiving module 1112, perturbation error calculation module 1114, 3D line segment generation module 1116, reprojection error calculation module 1118, weight calculation module 1120, camera pose pair selection module 1122 and/or other instruction modules.

Image receiving module 1108 may be configured to receive a plurality of images. Camera pose receiving module 1110 may receive a plurality of camera poses. The plurality of camera poses are associated with the plurality of images. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like.

2D line segment receiving module 1112 may be configured to receive, for each image of the plurality of images, a 2D line segment. The 2D line segments of the plurality of images may correspond to one another. In some embodiments, the 2D line segments may include vertical line segments. In some embodiments, the vertical line segments are perpendicular to a ground plane. In some embodiments, the 2D line segments may include horizontal line segments. The 2D line segments may be image markups. The 2D line segments may be detected using one or more computer vision techniques such as, for example, line detection. The 2D line segments may be provided by user input.

Perturbation error calculation module 1114 may be configured to calculate a perturbation error for each pair of images of the plurality of images. Perturbation error is described herein, for example with reference to FIGS. 13 through 15.

3D line segment generation module 1116 may be configured to generate a 3D line segment for each pair of images of the plurality of images based on a 2D line segment in a first image of a pair of images and a 2D line segment in a second image of the pair of images. In some embodiments, generating the 3D line segment may include triangulating the 2D line segment in the first image of the pair of images and the 2D line segment in the second image of the pair of images. In some embodiments, generating the 3D line segment include triangulating a first end point of the 2D line segment in the first image of the pair of images and a corresponding first end point of the 2D line segment in the second image of the pair of images, and triangulating a second end point of the 2D line segment in the first image of the pair of images and a corresponding second end point of the 2D line segment in the second image of the pair of images.

Reprojection error calculation module 1118 may be configured to calculate projection errors of a 3D line segment, for example the 3D line generated by 3D line segment generation module 1116, into each of the plurality of images.

In some embodiments, calculating the reprojection errors of the 3D line segment includes, calculating a reprojection error for each image of the plurality of images based on a difference between a reprojection of a first end point of the 3D line segment and a corresponding first end point of the 2D line segment in the image and a difference between a reprojection of a second end point of the 3D line segment and a corresponding second end point of the 2D line segment in the image. In some embodiments, the reprojection error may be a sum of an absolute value of the difference between the reprojection of the first end point of the 3D line segment and the corresponding first end point of the 2D line segment in the image and an absolute value of the difference between a reprojection of a second end point of the 3D line segment and a corresponding second end point of the 2D line segment in the image.

Weight calculation module 1120 may be configured to calculate a weight based on the perturbation error, for example as calculated by perturbation error calculation module 1114, and the reprojection errors, for example as calculated by reprojection error calculation module 1118.

In some embodiments, calculating the weight includes calculating a product of an inverse of the perturbation error and an inverse of a sum of the reprojection errors. Equation 1 illustrates this calculation according to some embodiments.

$$\text{weight} = \frac{1}{\text{perturbation error}} * \frac{1}{\sum \text{reprojection errors}} \qquad \text{Equation 1}$$

In some embodiments, weight calculation module 1120 may be configured to calculate a weighted average measurement for a dimensional value for each 3D line segment. Equation 2 illustrates this calculation according to some embodiments.

$$\text{weighted average measurement} = \\ \frac{d_1 * w_1 + d_2 * w_2 + \ldots + d_N * w_N}{w_1 + w_2 + \ldots + w_N} \qquad \text{Equation 2}$$

Where $d_1$ is a dimensional value of a 3D line segment of a first pair of images of the plurality of images, $d_2$ is a dimensional value of a 3D line segment of a second pair of images of the plurality of images, $d_N$ is a dimensional value of a 3D line segment of a Nth pair of images of the plurality of images, $w_1$ is a weight of the first pair of images of the plurality of images, $w_2$ is a weight of the second pair of images of the plurality of images, and $w_N$ is a weight of the Nth pair of images of the plurality of images. The weight of the pair of images may be calculated by weight calculation module 1120. In some embodiments, 3D line segment generation module 1116 may be configured to calculate a dimensional value of a 3D line segment.

In some embodiments, calculating the weight may be further based on a distance between a first camera pose associated with the first image of the pair of images and a second camera pose associated with the second image of the pair of images. In some embodiments, calculating the weight includes calculating a product of an inverse of the perturbation error, an inverse of a sum of the reprojection errors, and the distance between the first camera pose and the second camera pose. Equation 3 illustrates this calculation according to some embodiments.

$$\text{weight} = \frac{1}{\text{perturbation error}} * \frac{1}{\sum \text{reprojection errors}} * \quad \text{Equation 3}$$

$$\text{distance between } 1st \text{ camera pose and } 2nd \text{ camera pose}$$

Camera pose pair selection module 1122 may be configured to select a pair of camera poses of pairs of camera poses associated with a largest weight. The selected pair of camera poses may correspond to a most consistent pair of camera poses of the plurality of camera poses.

In some embodiments, one or more modules, such as 3D line segment generation module 1116, may be configured to generate a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. In some embodiments, one or more modules may be configured to scale a 3D building model based on the selected pair of camera poses and according to the generated dimensional value of the generated 3D line segment. In some embodiments, generating the dimensional value of the generated 3D line segment includes selecting a 3D line segment associated with a greatest weight.

In some implementations, computing platform(s) 1102, remote platform(s) 1104, and/or external resources 1124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1102, remote platform(s) 1104, and/or external resources 1124 may be operatively linked via some other communication media.

A given remote platform 1104 may include one or more processors configured to execute computer program modules. The computer program modules may be configured to enable an expert or user associated with the given remote platform 1104 to interface with system 1100 and/or external resources 1124, and/or provide other functionality attributed herein to remote platform(s) 1104. By way of non-limiting example, a given remote platform 1104 and/or a given computing platform 1102 may include one or more of a server, a desktop computer, a laptop computer, a handheld computer, a tablet computing platform, a NetBook, a Smartphone, a gaming console, and/or other computing platforms.

External resources 1124 may include sources of information outside of system 1100, external entities participating with system 1100, and/or other resources. In some implementations, some or all of the functionality attributed herein to external resources 1124 may be provided by resources included in system 1100.

Computing platform(s) 1102 may include electronic storage 1126, one or more processors 1128, and/or other components. Computing platform(s) 1102 may include communication lines, or ports to enable the exchange of information with a network and/or other computing platforms. Illustration of computing platform(s) 1102 in FIG. 11 is not intended to be limiting. Computing platform(s) 1102 may include a plurality of hardware, software, and/or firmware components operating together to provide the functionality attributed herein to computing platform(s) 1102. For example, computing platform(s) 1102 may be implemented by a cloud of computing platforms operating together as computing platform(s) 1102.

Electronic storage 1126 may comprise non-transitory storage media that electronically stores information. The electronic storage media of electronic storage 1126 may include one or both of system storage that is provided integrally (i.e., substantially non-removable) with computing platform(s) 1102 and/or removable storage that is removably connectable to computing platform(s) 1102 via, for example, a port (e.g., a USB port, a firewire port, etc.) or a drive (e.g., a disk drive, etc.). Electronic storage 1126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1126 may include one or more virtual storage resources (e.g., cloud storage, a virtual private network, and/or other virtual storage resources). Electronic storage 1126 may store software algorithms, information determined by processor(s) 1128, information received from computing platform(s) 1102, information received from remote platform(s) 1104, and/or other information that enables computing platform(s) 1102 to function as described herein.

Processor(s) 1128 may be configured to provide information processing capabilities in computing platform(s) 1102. As such, processor(s) 1128 may include one or more of a digital processor, an analog processor, a digital circuit designed to process information, an analog circuit designed to process information, a state machine, and/or other mechanisms for electronically processing information. Although processor(s) 1128 is shown in FIG. 11 as a single entity, this is for illustrative purposes only. In some implementations, processor(s) 1128 may include a plurality of processing units. These processing units may be physically located within the same device, or processor(s) 1128 may represent processing functionality of a plurality of devices operating in coordination. Processor(s) 1128 may be configured to execute modules 1108, 1110, 1112, 1114, 1116, 1118, 1120, and/or 1122, and/or other modules. Processor(s) 1128 may be configured to execute modules 1108, 1110, 1112, 1114, 1116, 1118, 1120, and/or 1122, and/or other modules by software; hardware; firmware; some combination of software, hardware, and/or firmware; and/or other mechanisms for configuring processing capabilities on processor(s) 1128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1108, 1110, 1112, 1114, 1116, 1118, 1120, and/or 1122 are illustrated in FIG. 11 as being implemented within a single processing unit, in implementations in which processor(s) 1128 includes multiple processing units, one or more of modules 1108, 1110, 1112, 1114, 1116, 1118, 1120, and/or 1122 may be implemented remotely from the other modules. The description of the functionality provided by the different modules 1108, 1110, 1112, 1114, 1116, 1118, 1120, and/or 1122 described below is for illustrative purposes, and is not intended to be limiting, as any of modules 1108, 1110, 1112, 1114, 1116, 1118, 1120, and/or 1122 may provide more or less functionality than is described. For example, one or more of modules 1108, 1110, 1112, 1114, 1116, 1118, 1120, and/or 1122 may be eliminated, and some or all of its functionality may be provided by other ones of modules 1108, 1110, 1112, 1114, 1116, 1118, 1120, and/or 1122. As another example, processor(s) 1128 may be configured to execute one or more additional modules that may perform some or all of the functionality attributed below to one of modules 1108, 1110, 1112, 1114, 1116, 1118, 1120, and/or 1122.

Figure 12:
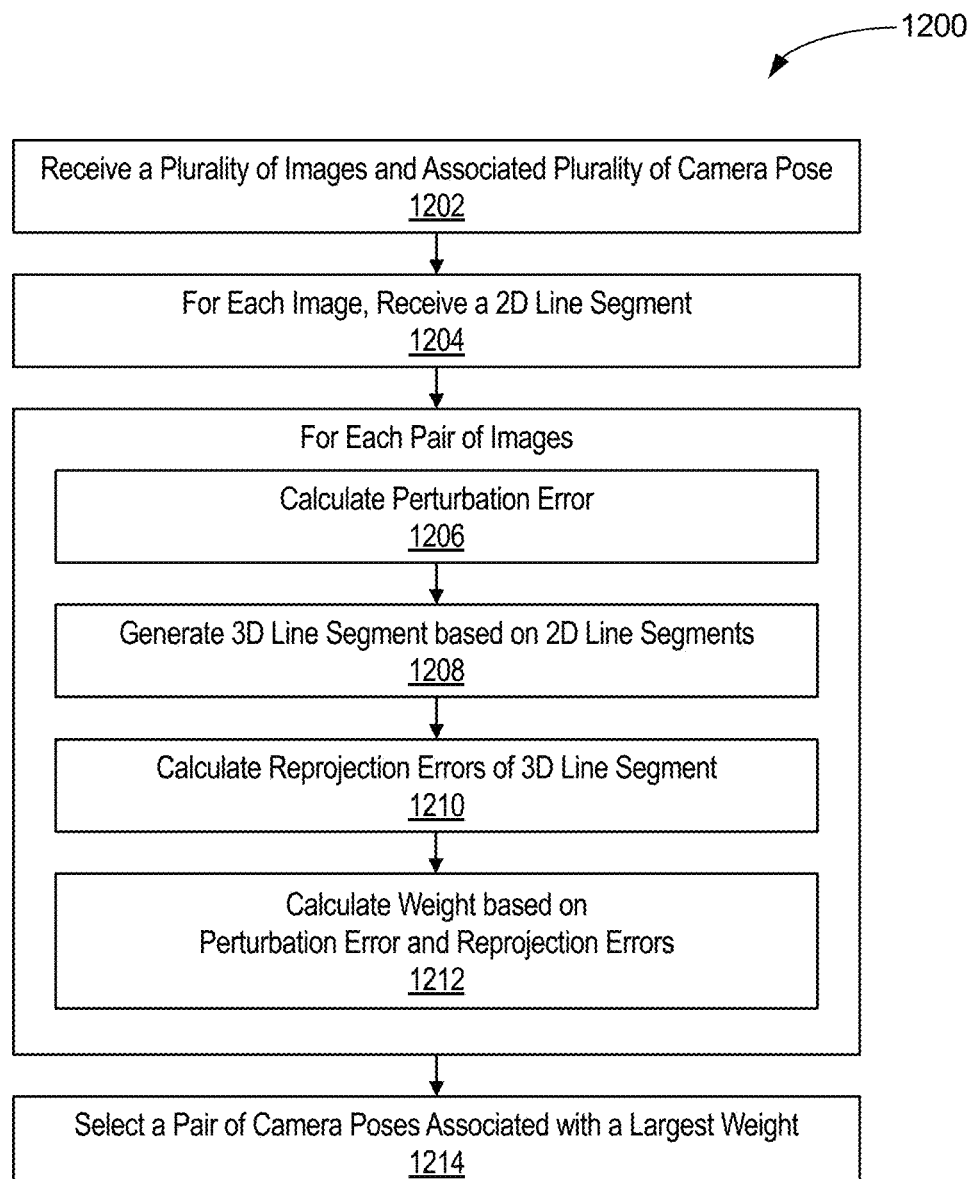
FIG. 12 illustrates a method of selecting a pair of consistent real-world camera poses for three-dimensional reconstruction, in accordance with one or more implementations.

FIG. 12 illustrates a method 1200 for selecting a pair of consistent real-world camera poses for three-dimensional reconstruction, in accordance with one or more implementations. The operations of method 1200 presented below are intended to be illustrative. In some implementations, method 1200 may be accomplished with one or more additional operations not described, and/or without one or more of the operations discussed. Additionally, the order in which the operations of method 1200 are illustrated in FIG. 12 and described below is not intended to be limiting.

In some implementations, method 1200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

An operation 1202 may include receiving a plurality of images and an associated plurality of camera poses. The plurality of camera poses are associated with the plurality of images. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like. Operation 1202 may be performed by one or more hardware processors configured by machine-readable instructions including a module that is the same as or similar to image receiving module 1108 and camera pose receiving module 1110, in accordance with one or more implementations.

An operation 1204 may include, for each image of the plurality of images, receiving a 2D line segment. The 2D line segments of the plurality of images may correspond to one another. In some embodiments, the 2D line segments may include vertical line segments. In some embodiments, the vertical line segments are perpendicular to a ground plane. In some embodiments, the 2D line segments may include horizontal line segments. The 2D line segments may be image markups. The 2D line segments may be detected using one or more computer vision techniques such as, for example, line detection. The 2D line segments may be provided by user input. Operation 1204 may be performed by one or more hardware processors configured by machine-readable instructions including a module that is the same as or similar to 2D line segment receiving module 1112, in accordance with one or more implementations.

Operations 1206 through 1212 may be performed for each pair of images of the plurality of images.

An operation 1206 may include calculating a perturbation error. Perturbation error is described herein, for example with reference to FIGS. 13 through 15. Operation 1206 may be performed by one or more hardware processors configured by machine-readable instructions including a module that is the same as or similar to perturbation error calculation module 1114, in accordance with one or more implementations.

An operation 1208 may include generating a 3D line segment based on a 2D line segment in a first image of the pair of images and a 2D line segment in a second image of the pair of images. In some embodiments, generating the 3D line segment may include triangulating the 2D line segment in the first image of the pair of images and the 2D line segment in the second image of the pair of images. In some embodiments, generating the 3D line segment include triangulating a first end point of the 2D line segment in the first image of the pair of images and a corresponding first end point of the 2D line segment in the second image of the pair of images, and triangulating a second end point of the 2D line segment in the first image of the pair of images and a corresponding second end point of the 2D line segment in the second image of the pair of images. Operation 1208 may be performed by one or more hardware processors configured by machine-readable instructions including a module that is the same as or similar to 3D line segment generation module 1116, in accordance with one or more implementations.

An operation 1210 may include calculating reprojection errors of the 3D line segment into each of the plurality of images. In some embodiments, calculating the reprojection errors of the 3D line segment includes, calculating a reprojection error for each image of the plurality of images based on a difference between a reprojection of a first end point of the 3D line segment and a corresponding first end point of the 2D line segment in the image and a difference between a reprojection of a second end point of the 3D line segment and a corresponding second end point of the 2D line segment in the image. In some embodiments, the reprojection error may be a sum of an absolute value of the difference between the reprojection of the first end point of the 3D line segment and the corresponding first end point of the 2D line segment in the image and an absolute value of the difference between a reprojection of a second end point of the 3D line segment and a corresponding second end point of the 2D line segment in the image. Operation 1210 may be performed by one or more hardware processors configured by machine-readable instructions including a module that is the same as or similar to reprojection error calculation module 1118, in accordance with one or more implementations.

An operation 1212 may include calculating a weight based on the perturbation error, for example as calculated in operation 1206, and the reprojection errors, for example as calculated in operation 1210. In some embodiments, calculating the weight includes calculating a product of an inverse of the perturbation error and an inverse of a sum of the reprojection errors. Equation 1 illustrates this calculation according to some embodiments. In some embodiments, calculating the weight may be further based on a distance between a first camera pose associated with the first image of the pair of images and a second camera pose associated with the second image of the pair of images. In some embodiments, calculating the weight includes calculating a product of an inverse of the perturbation error, an inverse of a sum of the reprojection errors, and the distance between the first camera pose and the second camera pose. Equation 3 illustrates this calculation according to some embodiments. Operation 1212 may be performed by one or more hardware processors configured by machine-readable instructions including a module that is the same as or similar to weight calculation module 1120, in accordance with one or more implementations.

An operation 1214 may include selecting a pair of camera poses of pairs of camera poses associated with a largest weight. Operation 1214 may be performed by one or more hardware processors configured by machine-readable instructions including a module that is the same as or similar to camera pose pair selection module 1122, in accordance with one or more implementations.

In some embodiments, method 1200 may further include calculating a weighted average measurement for a dimensional value for each 3D line segment. Equation 2 illustrates this calculation according to some embodiments. In some embodiments, operation 1208 may include calculating a dimensional value of a 3D line segment.

In some embodiments, method 1200 may further include generating a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. These operations may be performed by one or more hardware processors configured by machine-readable instructions including a module that is the same as or similar to 3D line segment generation module 1116, in accordance with one or more implementations. In some embodiments, method 1200 may further include scaling a 3D building model based on the selected pair of camera poses and according to the generated dimensional value of the generated 3D line segment. In some embodiments, generating the dimensional value of the generated 3D line segment includes selecting a 3D line segment associated with a greatest weight.

Figure 13:
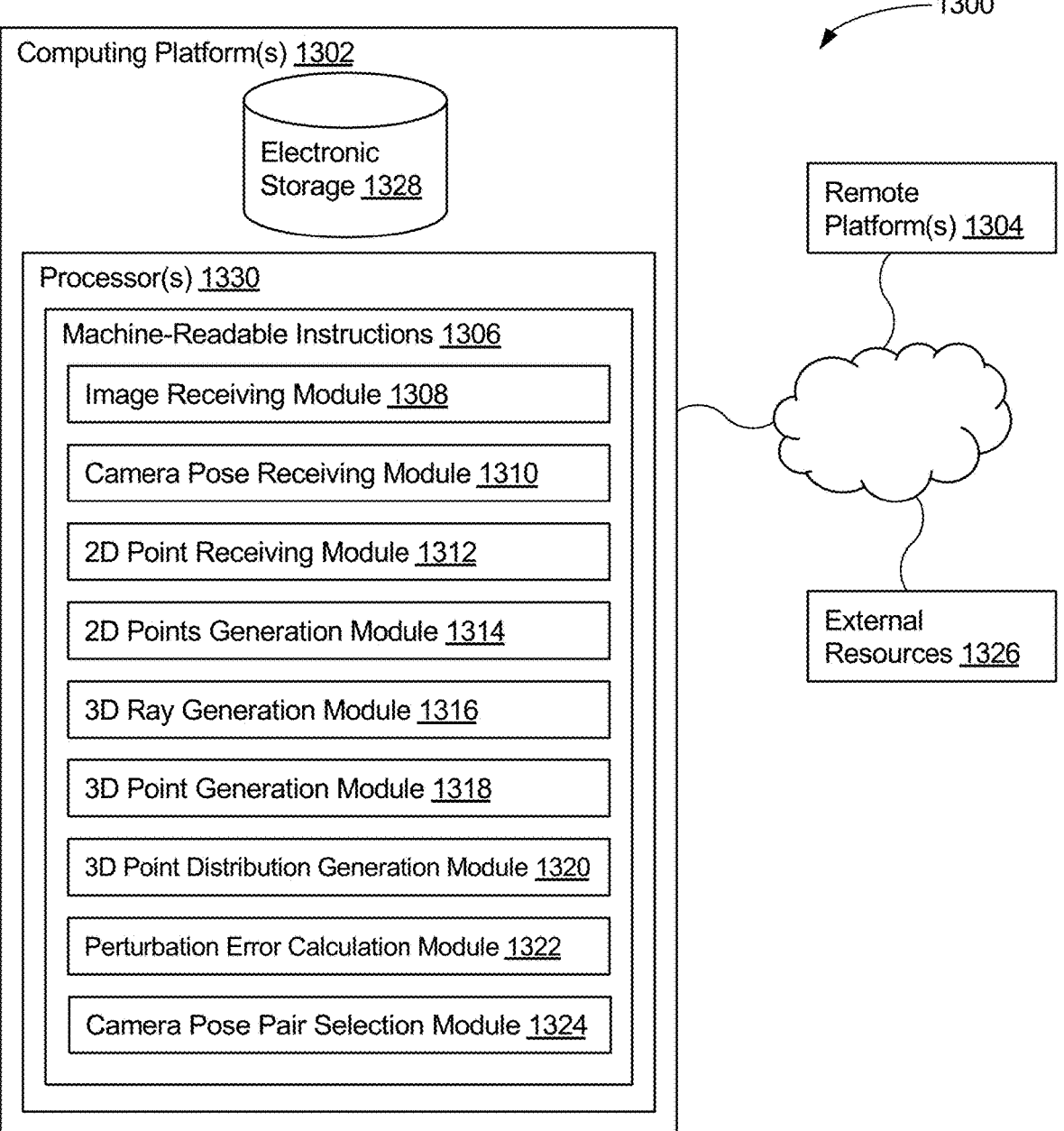
FIG. 13 illustrates a system configured for selecting a pair of consistent real-world camera poses for three-dimensional reconstruction, in accordance with one or more implementations.

FIG. 13 illustrates a system 1300 configured for selecting a pair of consistent real-world camera poses for three-dimensional reconstruction, in accordance with one or more implementations. In some implementations, system 1300 may include one or more computing platforms 1302. Computing platform(s) 1302 may be configured to communicate with one or more remote platforms 1304 according to a client/server architecture, a peer-to-peer architecture, and/or other architectures. Remote platform(s) 1304 may be configured to communicate with other remote platforms via computing platform(s) 1302 and/or according to a client/server architecture, a peer-to-peer architecture, and/or other architectures. Users may access system 1300 via remote platform(s) 1304.

Computing platform(s) 1302 may be configured by machine-readable instructions 1306. Machine-readable instructions 1306 may include one or more instruction modules. The instruction modules may include computer program modules. The instruction modules may include one or more of image receiving module 1308, camera pose receiving module 1310, 2D line segment receiving module 1312, 2D points generation module 1314, 3D ray generation module 1316, 3D point generation module 1318, 3D point distribution generation module 1320, perturbation error calculation module 1322, camera pose pair selection module 1324, and/or other instruction modules.

Image receiving module 1308 may be configured to receive a plurality of images. Camera pose receiving module 1310 may receive a plurality of camera poses. The plurality of camera poses are associated with the plurality of images. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like.

2D point receiving module 1312 may be configured to receive, for each image of the plurality of images, a 2D point. The 2D points of the plurality of images may correspond to one another. The 2D point may be an image markup. The 2D point may be detected using one or more computer vision techniques such as, for example, point detection. The 2D point may be provided by user input.

In some embodiments, the 2D point may be an end point of a 2D line segment in the image. In these embodiments, 2D point receiving module 1312 may be configured to receive, for each image of the plurality of images, a 2D line segment. The 2D line segments of the plurality of images may correspond to one another. In some embodiments, the 2D line segments are vertical line segments. In some embodiments, the vertical line segments are perpendicular to a ground plane. In some embodiments, the 2D line segments are horizontal line segments. The 2D line segment may be an image markup. The 2D line segment may be detected using one or more computer vision techniques such as, for example, line detection. The 2D line segment may be provided by user input.

In some embodiments, a first received 2D point is a first 2D end point of a first 2D line segment in the first image, a second received 2D point is a second 2D end point of a second 2D line segment in the second image, and the first 2D end point corresponds to the second 2D end point.

In some embodiments, a first received 2D point is a first 2D end point of a first 2D line segment in a first image, a second received 2D point is a second 2D end point of a second 2D line segment in a second image, a third received 2D point is a third 2D end point of the first 2D line segment in the first image, a fourth received 2D point is a fourth 2D end point of the second 2D line segment in the second image, the first 2D end point corresponds to the second 2D end point, and the third 2D end point correspond to the fourth 2D end point.

2D points generation module 1314 may be configured to generate 2D points for each image of a pair of images.

2D points generation module 1314 may be configured to generate a first plurality of 2D points for a first image of the pair of images. The first plurality of 2D points may include a first received 2D point and a plurality of points around the first received 2D point. The plurality of points around the first received 2D point may be one or more pixels distance in a given direction from the first received 2D point in image space of the first image.

2D points generation module 1314 may be configured to generate a second plurality of 2D points for a second image of the pair of images. The second plurality of 2D points may include a second received 2D point and a plurality of points around the second received 2D point. The plurality of points around the second received 2D point may be one or more pixels distance in a given direction from the second received 2D point in image space of the second image. In some embodiments, the pixel distance from the plurality of points around the second received 2D point and the second received 2D point is the same pixel distance as the plurality of points around the first received 2D point and the first received 2D point. In other words, the pixel distances may be the same.

2D points generation module 1314 may be configured to generate a third plurality of 2D points for the first image of the pair of images. The third plurality of 2D points may include a third received 2D point and a plurality of points around the third received 2D point. The plurality of points around the third received 2D point may be one or more pixels distance in a given direction from the third received 2D point in image space of the first image.

2D points generation module 1314 may be configured to generate a fourth plurality of 2D points for the second image of the pair of images. The fourth plurality of 2D points may include a fourth received 2D point and a plurality of points around the fourth received 2D point. The plurality of points around the fourth received 2D point may be one or more pixels distance in a given direction from the fourth received 2D point in image space of the second image. In some embodiments, the pixel distance from the plurality of points around the fourth received 2D point and the fourth received 2D point is the same pixel distance as the plurality of points around the third received 2D point and the third received 2D point. In other words, the pixel distances may be the same.

3D ray generation module 1316 may be configured to generate 3D rays for each image of a pair of images. Each 3D ray may connect a camera pose and a 2D point.

3D ray generation module 1316 may be configured to generate a first plurality 3D rays based at least in part on a first camera pose associated with the first image and the first plurality of 2D points. Each 3D ray of the first plurality of 3D rays connects the first camera pose associated with the first image and a 2D point of the first plurality of 2D points.

3D ray generation module 1316 may be configured to generate a second plurality of 3D rays based at least in part on a second camera pose associated with the second image and the second plurality of 2D points. Each 3D ray of the second plurality of 3D rays connects the second camera pose associated with the second image and a 2D point of the second plurality of 2D points.

3D ray generation module 1316 may be configured to generate a third plurality 3D rays based at least in part on the first camera pose associated with the first image and the third plurality of 2D points. Each 3D ray of the third plurality of 3D rays connects the first camera pose associated with the first image and a 2D point of the third plurality of 2D points.

3D ray generation module 1316 may be configured to generate a fourth plurality of 3D rays based at least in part on the second camera pose associated with the second image and the fourth plurality of 2D points. Each 3D ray of the fourth plurality of 3D rays connects the second camera pose associated with the second image and a 2D point of the fourth plurality of 2D points.

3D point generation module 1318 may be configured to generate a plurality of 3D points based on intersections of 3D rays. 3D point generation module 1318 may be configured to generate a first plurality of 3D points based on intersections of the first plurality of 3D rays and the second plurality of 3D rays. 3D point generation module 1318 may be configured to generate a second plurality of 3D points based on intersections of the third plurality of 3D rays and the fourth plurality of 3D rays.

3D point distribution generation module 1320 may be configured to generate a 3D point distribution of a plurality of 3D points. In some embodiments, generating a 3D point distribution of a plurality of 3D points includes generating a 3D bounding volume of the plurality of 3D points. In some embodiments, a 3D point distribution may be represented as a 3D bounding volume. Examples of 3D bounding volumes include spheres, cuboids, and the like.

3D point distribution generation module 1320 may be configured to generate a first 3D point distribution of the first plurality of 3D points. 3D point distribution generation module 1320 may be configured to generate a second 3D point distribution of the second plurality of 3D points.

Perturbation error calculation module 1322 may be configured to calculate a perturbation error based on a degree of the first 3D point distribution. Perturbation error calculation module 1322 may be configured to calculate the perturbation error further based on a degree of the second 3D point distribution.

In some embodiments, 3D point distribution generation module 1320, perturbation error calculation module 1322, or both, may generate or calculate a size of a 3D bounding volume. In some embodiments, a size of a 3D bounding volume may be based on a linear dimension, a volume, and the like. In some embodiments, 3D point distribution generation module 1320, perturbation error calculation module 1322, or both, may generate or calculate a 3D dimension of the 3D bounding volume. In some embodiments, a 3D dimension may be a based on a radius of a sphere, a diagonal of a cuboid, and the like.

In some embodiments, point distribution generation module 1320, perturbation error calculation module 1322, or both, may generate or calculate a degree of a 3D point distribution by projecting a plurality of 3D points onto a plane, for example a ground plane, and calculating a size of a 2D bounding area of the plurality of projected points. Examples of 2D bounding areas include circles, rectangles, and the like. In some embodiments, a size of a 2D bounding area may be based on a linear dimension, an area, and the like. In some embodiments, 3D point distribution generation module 1320, perturbation error calculation module 1322, or both, may generate or calculate a 2D dimension of the 2D bounding area. In some embodiments, a 2D dimension may be a based on a radius of a circle, a diagonal of a rectangle, and the like.

Camera pose pair selection module 1324 may be configured to select a pair of camera poses of pairs of camera poses associated with a smallest perturbation error. The selected pair of camera poses may correspond to a most consistent pair of camera poses of the plurality of camera poses.

In some embodiments, one or more modules, such as 3D ray generation module 1316, may be configured to generate a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. In some embodiments, one or more modules may be configured to scale a 3D building model based on the selected pair of camera poses and according to the generated dimensional value of the generated 3D line segment.

In some implementations, computing platform(s) 1302, remote platform(s) 1304, and/or external resources 1326 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1302, remote platform(s) 1304, and/or external resources 1326 may be operatively linked via some other communication media.

A given remote platform 1304 may include one or more processors configured to execute computer program modules. The computer program modules may be configured to enable an expert or user associated with the given remote platform 1304 to interface with system 1300 and/or external resources 1326, and/or provide other functionality attributed herein to remote platform(s) 1304. By way of non-limiting example, a given remote platform 1304 and/or a given computing platform 1302 may include one or more of a server, a desktop computer, a laptop computer, a handheld computer, a tablet computing platform, a NetBook, a Smartphone, a gaming console, and/or other computing platforms.

External resources 1326 may include sources of information outside of system 1300, external entities participating with system 1300, and/or other resources. In some implementations, some or all of the functionality attributed herein to external resources 1326 may be provided by resources included in system 1300.

Computing platform(s) 1302 may include electronic storage 1328, one or more processors 1330, and/or other components. Computing platform(s) 1302 may include communication lines, or ports to enable the exchange of information with a network and/or other computing platforms. Illustration of computing platform(s) 1302 in FIG. 13 is not intended to be limiting. Computing platform(s) 1302 may include a plurality of hardware, software, and/or firmware components operating together to provide the functionality attributed herein to computing platform(s) 1302. For example, computing platform(s) 1302 may be implemented by a cloud of computing platforms operating together as computing platform(s) 1302.

Electronic storage 1328 may comprise non-transitory storage media that electronically stores information. The electronic storage media of electronic storage 1328 may include one or both of system storage that is provided integrally (i.e., substantially non-removable) with computing platform(s) 1302 and/or removable storage that is removably connectable to computing platform(s) 1302 via, for example, a port (e.g., a USB port, a firewire port, etc.) or a drive (e.g., a disk drive, etc.). Electronic storage 1328 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1328 may include one or more virtual storage resources (e.g., cloud storage, a virtual private network, and/or other virtual storage resources). Electronic storage 1328 may store software algorithms, information determined by processor(s) 1330, information received from computing platform(s) 1302, information received from remote platform(s) 1304, and/or other information that enables computing platform(s) 1302 to function as described herein.

Processor(s) 1330 may be configured to provide information processing capabilities in computing platform(s) 1302. As such, processor(s) 1330 may include one or more of a digital processor, an analog processor, a digital circuit designed to process information, an analog circuit designed to process information, a state machine, and/or other mechanisms for electronically processing information. Although processor(s) 1330 is shown in FIG. 13 as a single entity, this is for illustrative purposes only. In some implementations, processor(s) 1330 may include a plurality of processing units. These processing units may be physically located within the same device, or processor(s) 1330 may represent processing functionality of a plurality of devices operating in coordination. Processor(s) 1330 may be configured to execute modules 1308, 1310, 1312, 1314, 1316, 1318, 1320, 1322 and/or 1324, and/or other modules. Processor(s) 1330 may be configured to execute modules 1308, 1310, 1312, 1314, 1316, 1318, 1320, 1322 and/or 1324, and/or other modules by software; hardware; firmware; some combination of software, hardware, and/or firmware; and/or other mechanisms for configuring processing capabilities on processor(s) 1330. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1308, 1310, 1312, 1314, 1316, 1318, 1320, 1322 and/or 1324 are illustrated in FIG. 13 as being implemented within a single processing unit, in implementations in which processor(s) 1330 includes multiple processing units, one or more of modules 1308, 1310, 1312, 1314, 1316, 1318, 1320, 1322 and/or 1324 may be implemented remotely from the other modules. The description of the functionality provided by the different modules 1308, 1310, 1312, 1314, 1316, 1318, 1320, 1322 and/or 1324 described below is for illustrative purposes, and is not intended to be limiting, as any of modules 1308, 1310, 1312, 1314, 1316, 1318, 1320, 1322 and/or 1324 may provide more or less functionality than is described. For example, one or more of modules 1308, 1310, 1312, 1314, 1316, 1318, 1320, 1322 and/or 1324 may be eliminated, and some or all of its functionality may be provided by other ones of modules 1308, 1310, 1312, 1314, 1316, 1318, 1320, 1322 and/or 1324. As another example, processor(s) 1330 may be configured to execute one or more additional modules that may perform some or all of the functionality attributed below to one of modules 1308, 1310, 1312, 1314, 1316, 1318, 1320, 1322 and/or 1324.

FIG. 14 illustrates a method 1400 for selecting a pair of consistent real-world camera poses for three-dimensional reconstruction, in accordance with one or more implementations. The operations of method 1400 presented below are intended to be illustrative. In some implementations, method 1400 may be accomplished with one or more additional operations not described, and/or without one or more of the operations discussed. Additionally, the order in which the operations of method 1400 are illustrated in FIG. 14 and described below is not intended to be limiting.

In some implementations, method 1400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1400 in response to instructions stored electronically on an electronic storage medium. The one or more processing devices may include one or more devices configured through hardware, firmware, and/or software to be specifically designed for execution of one or more of the operations of method 1400.

An operation 1402 may include receiving a plurality of images and an associated plurality of camera poses. The plurality of camera poses are associated with the plurality of images. The plurality of images and the plurality of camera poses may be captured concurrently, for example by a capture device. The capture device may be handheld, such as a smartphone/mobile device, a tablet computer, a headset, a drone, an aerial imager, and the like. The capture device may include one or more sensors that capture sensor data that may be used to calculate camera pose. Examples of sensors include inertial measurement units (IMUs), accelerometers, gyroscopes, magnetometers, light sensors, camera sensors, depth sensors, and the like. Examples of sensor data include inertial sensor data, accelerometer sensor data, gyroscope sensor data, magnetometer sensor data, light sensor data, camera sensor data, depth data, and the like. Operation 1402 may be performed by one or more hardware processors configured by machine-readable instructions including a module that is the same as or similar to image receiving module 1408 and camera pose receiving module 1410, in accordance with one or more implementations.

An operation 1404 may include, for each image of the plurality of images, receiving a 2D point. The 2D points of the plurality of images may correspond to one another. The 2D point may be an image markup. The 2D point may be detected using one or more computer vision techniques such as, for example, point detection. The 2D point may be provided by user input. Operation 1404 may be performed by one or more hardware processors configured by machine-readable instructions including a module that is the same as or similar to 2D point receiving module 1312, in accordance with one or more implementations.

In some embodiments, the 2D point may be an end point of a 2D line segment in the image. Operation 1404, or one or more other operations illustrated or otherwise, may include, for each image of the plurality of images, receiving a 2D line segment. The 2D line segments of the plurality of images may correspond to one another. In some embodiments, the 2D line segments are vertical line segments. In some embodiments, the vertical line segments are perpendicular to a ground plane. In some embodiments, the 2D line segments are horizontal line segments. The 2D line segment may be an image markup. The 2D line segment may be detected using one or more computer vision techniques such as, for example, line detection. The 2D line segment may be provided by user input.

Operations 1406 through 1418 may be performed for each pair of images of the plurality of images.

An operation 1406 may include generating a first plurality of 2D points for a first image of the pair of images. The first plurality of 2D points may include a first received 2D point and a plurality of points around the first received 2D point. The plurality of points around the first received 2D point may be one or more pixels distance in a given direction from the first received 2D point in image space of the first image. Operation 1406 may be performed by one or more hardware processors configured by machine-readable instructions including a module that is the same as or similar to 2D points generation module 1314, in accordance with one or more implementations.

An operation 1408 may include generating a second plurality of 2D points for a second image of the pair of images. The second plurality of 2D points may include a second received 2D point and a plurality of points around the second received 2D point. The plurality of points around the second received 2D point may be one or more pixels distance in a given direction from the second received 2D point in image space of the second image. In some embodiments, the pixel distance from the plurality of points around the second received 2D point and the second received 2D point is the same pixel distance as the plurality of points around the first received 2D point and the first received 2D point. In other words, the pixel distances may be the same. Operation 1408 may be performed by one or more hardware processors configured by machine-readable instructions including a module that is the same as or similar to 2D points generation module 1314, in accordance with one or more implementations.

In some embodiments, a first received 2D point is a first 2D end point of a first 2D line segment in the first image, a second received 2D point is a second 2D end point of a second 2D line segment in the second image, and the first 2D end point corresponds to the second 2D end point.

An operation 1410 may include generating a first plurality of 3D rays based at least in part on a first camera pose associated with the first image and the first plurality of 2D points. Each 3D ray of the first plurality of 3D rays connects the first camera pose associated with the first image and a 2D point of the first plurality of 2D points. Operation 1410 may be performed by one or more hardware processors configured by machine-readable instructions including a module that is the same as or similar to 3D ray generation module 1316, in accordance with one or more implementations.

An operation 1412 may include generating a second plurality of 3D rays based at least in part on a second camera pose associated with the second image and the second plurality of 2D points. Each 3D ray of the second plurality of 3D rays connects the second camera pose associated with the second image and a 2D point of the second plurality of 2D points. Operation 1412 may be performed by one or more hardware processors configured by machine-readable instructions including a module that is the same as or similar to 3D ray generation module 1316, in accordance with one or more implementations.

An operation 1414 may include generating a first plurality of 3D points based on intersections of the first plurality of 3D rays and the second plurality of 3D rays. Operation 1414 may be performed by one or more hardware processors configured by machine-readable instructions including a module that is the same as or similar to 3D point generation module 1318, in accordance with one or more implementations.

An operation 1416 may include generating a first 3D point distribution of the first plurality of 3D points. In some embodiments, generating the first 3D point distribution of the first plurality of 3D points includes generating a 3D bounding volume of the first plurality of 3D points. In some embodiments, the first 3D point distribution may be represented as a 3D bounding volume, such as a 3D convex hull or geometric volumes including spheres, cuboids, and the like. Operation 1416 may be performed by one or more hardware processors configured by machine-readable instructions including a module that is the same as or similar to 3D point distribution module 1320, in accordance with one or more implementations.

An operation 1418 may include calculating a perturbation error based on a degree of the first 3D point distribution. Operation 1418 may be performed by one or more hardware processors configured by machine-readable instructions including a module that is the same as or similar to perturbation error calculation module 1322, in accordance with one or more implementations.

In some embodiments, operation 1416, operation 1418, both, or additional operations may include generating or calculating a size of a 3D bounding volume including the first plurality of 3D points. In some embodiments, the size of the 3D bounding volume may be based on a linear dimension, a volume, and the like. In some embodiments, the degree of the first 3D point distribution may be related to the size of the 3D bounding volume. In some embodiments, operation 1416, operation 1418, both, or additional operations may include generating or calculating a 3D dimension of the 3D bounding volume. In some embodiments, a 3D dimension may be a based on a radius of a sphere, a diagonal of a cuboid, and the like. In some embodiments, the degree of the first 3D point distribution may be related to the dimensional value of the 3D dimension of the 3D bounding volume.

In some embodiments, operation 1416, operation 1418, both, or additional operations may include generating or calculating a degree of the first 3D point distribution by projecting the first plurality of 3D points onto a plane, for example a ground plane, and calculating a size of a 2D bounding area of the plurality of projected points. Examples of 2D bounding areas include circles, rectangles, and the like. In some embodiments, a size of a 2D bounding area may be based on a linear dimension, an area, and the like. In some embodiments, the degree of the first 3D point distribution may be related to the size of the 2D bounding area. In some embodiments, operation 1416, operation 1418, both, or additional operations may include generating or calculating a 2D dimension of the 2D bounding area. In some embodiments, a 2D dimension may be a based on a radius of a circle, a diagonal of a rectangle, and the like. In some embodiments, the degree of the first 3D point distribution may be related to the dimensional value of the 2D dimension of the 2D bounding area.

An operation 1420 may include selecting a pair of camera poses of pairs of camera poses associated with a smallest perturbation error. The selected pair of camera poses may correspond to a most consistent pair of camera poses of the plurality of camera poses.

In some embodiments, method 1400 may further include one or more additional operations. An operation may include generating a third plurality of 2D points for a first image of the pair of images. The third plurality of 2D points may include a third received 2D point and a plurality of points around the third received 2D point. The plurality of points around the third received 2D point may be one or more pixels distance in a given direction from the third received 2D point in image space of the first image. An operation may include generating a fourth plurality of 2D points for a second image of the pair of images. The fourth plurality of 2D points may include a fourth received 2D point and a plurality of points around the fourth received 2D point. The plurality of points around the fourth received 2D point may be one or more pixels distance in a given direction from the fourth received 2D point in image space of the second image. In some embodiments, the pixel distance from the plurality of points around the fourth received 2D point and the fourth received 2D point is the same pixel distance as the plurality of points around the third received 2D point and the third received 2D point. In other words, the pixel distances may be the same. In some embodiments, a first received 2D point is a first 2D end point of a first 2D line segment in a first image, a second received 2D point is a second 2D end point of a second 2D line segment in a second image, a third received 2D point is a third 2D end point of the first 2D line segment in the first image, a fourth received 2D point is a fourth 2D end point of the second 2D line segment in the second image, the first 2D end point corresponds to the second 2D end point, and the third 2D end point correspond to the fourth 2D end point. An operation may include generating a third plurality 3D rays based at least in part on the first camera pose associated with the first image and the third plurality of 2D points. Each 3D rays of the third plurality of 3D rays connects the first camera pose associated with the first image and a 2D point of the third plurality of 2D points. An operation may include generating a fourth plurality of 3D rays based at least in part on the second camera pose associated with the second image and the fourth plurality of 2D points. Each 3D rays of the fourth plurality of 3D rays connects the second camera pose associated with the second image and a 2D point of the fourth plurality of 2D points. An operation may include generating a second plurality of 3D points based on intersections of the third plurality of 3D rays and the fourth plurality of 3D rays. An operation may include generating a second 3D point distribution of the second plurality of 3D points. An operation, such as operation 1418, may calculate the perturbation error further based on a degree of the second 3D point distribution.

In some embodiments, method 1400 may further include generating a dimensional value of a generated 3D line segment generated based on a 2D line segment in a first image associated with a first camera pose of the selected pair of camera poses and a 2D line segment in a second image associated with a second camera pose of the selected pair of camera poses. In some embodiments, the dimensional value may be derived from an augmented reality dimensional value. In some embodiments, method 1400 may further include scaling a 3D building model based on the selected pair of camera poses and according to the generated dimensional value of the generated 3D line segment.

Figure 15A:
FIGS. 15A-15C are an exemplary illustration of selecting a pair of consistent real-world camera poses for three-dimensional reconstruction, in accordance with one or more implementations.
Figure 15B:
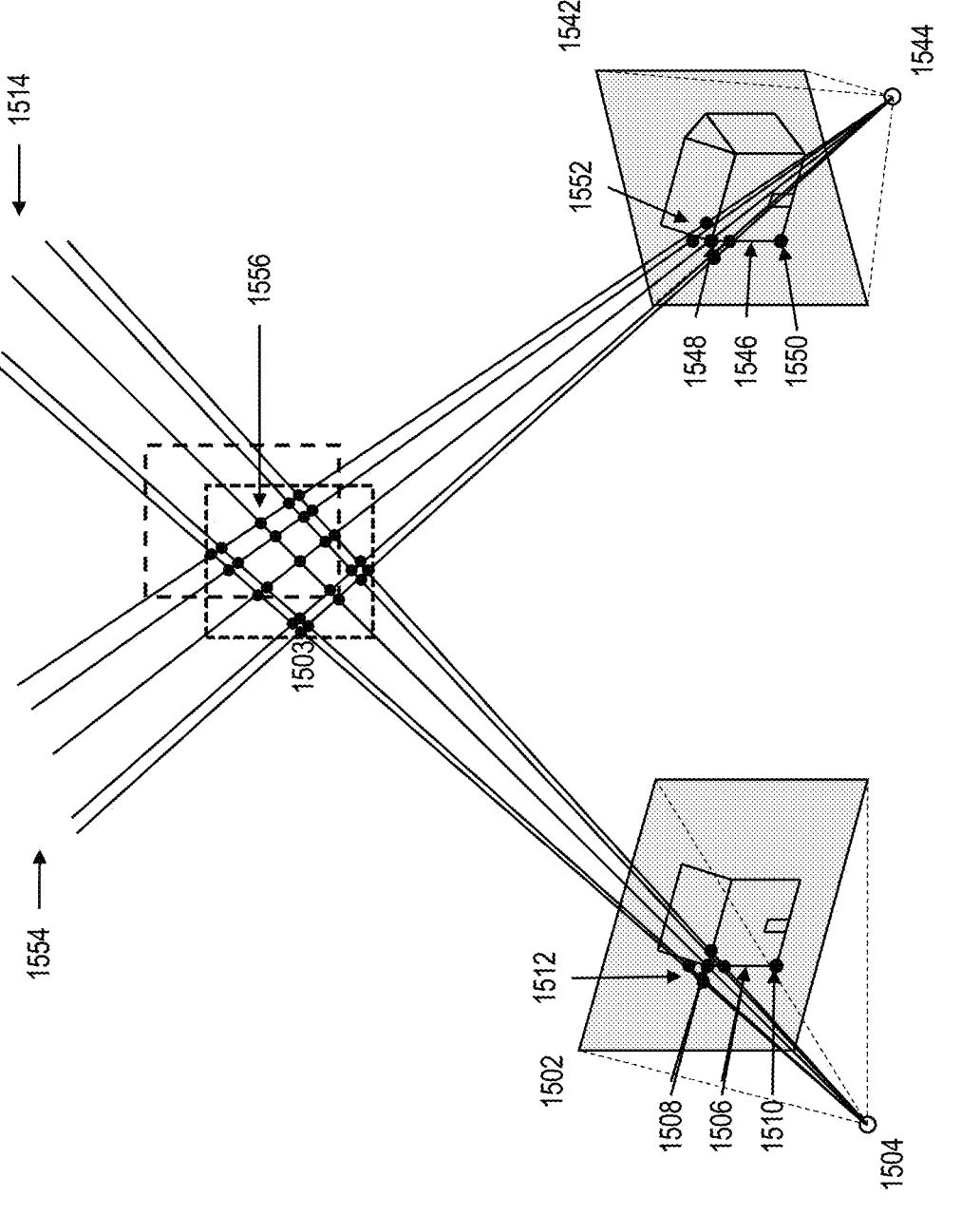
Figure 15C:
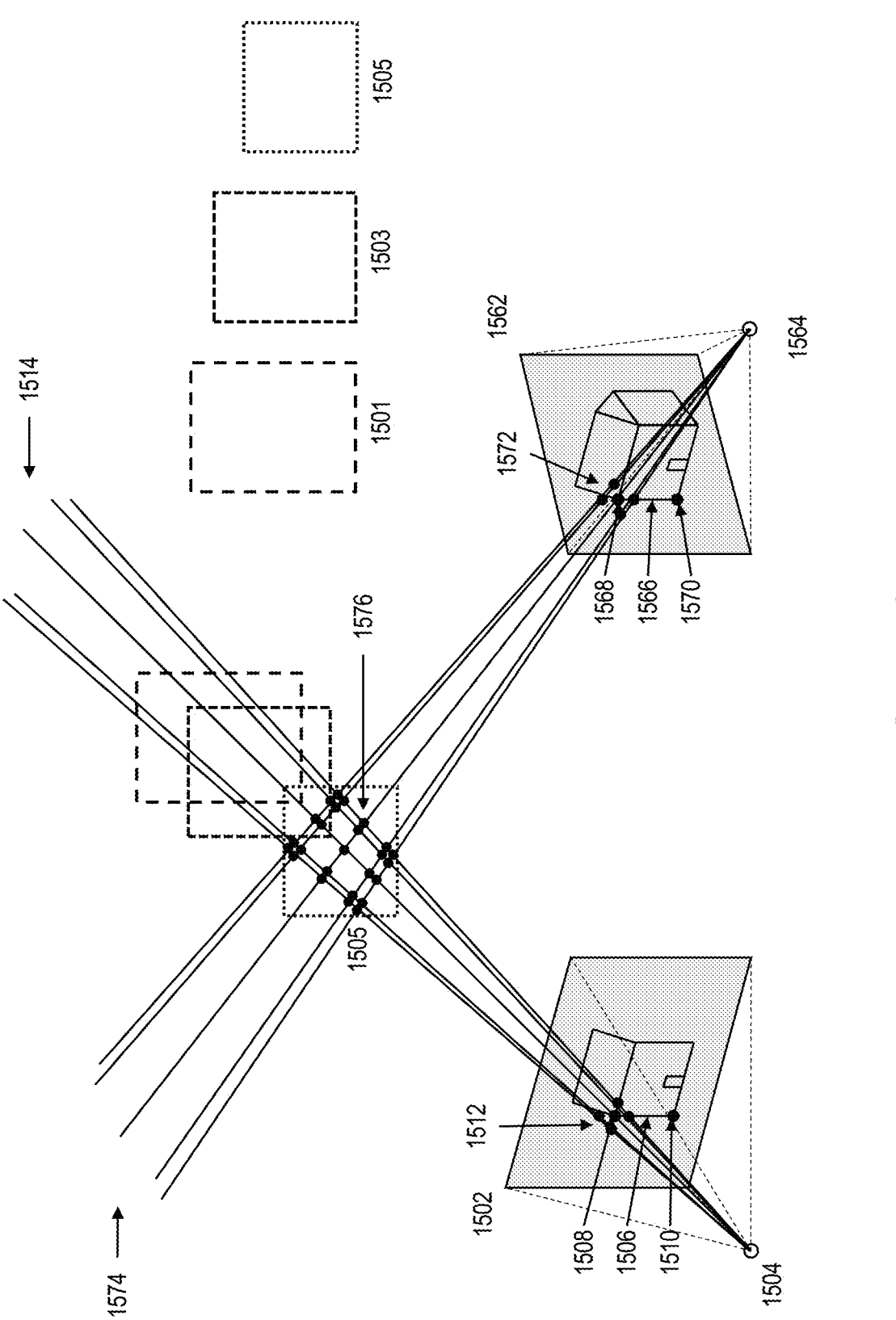

FIGS. 15A-15C are an exemplary illustration of selecting a pair of consistent real-world camera poses for three-dimensional reconstruction, in accordance with one or more implementations.

Images 1502, 1522, 1542, and 1562 and associated camera poses 1504, 1524, 1544, and 1564 are received. For each image 1502, 1522, 1542, and 1562, a 2D point is received. For image 1502, 2D point 1508 is received; for image 1522, 2D point 1528 is received; for image 1542, 2D point 1548 is received; and for image 1562, 2D point 1568 is received. 2D points 1508, 1528, 1548, and 1568 correspond to one another. As illustrated, 2D points 1508, 1528, 1548, and 1568 are 2D end points of 2D line segments 1506, 1526, 1546, and 1566, respectively. In some embodiments, 2D line segments 1506, 1526, 1546, and 1566 are received and 2D points 1508, 1528, 1548, and 1568 are determined therefrom. 2D line segments 1506, 1526, 1546, and 1566 correspond to one another.

For image pair 1502 and 1522 of FIG. 15A, 2D point groups 1512 and 1532 are generated as pixels offset by one or more pixels distances in a given direction from point 1508 and 1528 respectively (as illustrated, the points in point groups 1512 and 1532 are a single pixel in an up, down, left, and right offset from 2D points 1508 and 1528 respectively). 2D point group 1512 includes 2D point 1508 and 2D points around 2D point 1508, and 2D point group 1532 includes 2D point 1528 and 2D points around 2D point 1528. 3D rays 1514 are generated based at least in part on camera pose 1504 and 2D point group 1512, and 3D rays 1534 are generated based at least in part on camera pose 1524 and 2D point group 1532. 3D points 1536 are generated based on intersections of 3D rays 1514 and 1534. 3D point distribution 1501 of 3D points 1536 is generated; as illustrated 3D point distribution is a cuboid shape, but other convex hull geometries are enabled. A perturbation error for image pair 1502 and 1522 is calculated based on a degree of 3D point distribution 1501. In some embodiments, 3D point distribution 1501 may be measured according to a dimensional metric of the 3D point distribution; for example, in a cuboid 3D point distribution, a degree of 3D point distribution 1501 may be expressed as a dimensional value of a 3D diagonal of the cuboid.

For image pair 1502 and 1542 of FIG. 15B, 2D point groups 1512 and 1552 are generated in similar fashion as described in relation to FIG. 15A. 2D point group 1512 includes 2D point 1508 and 2D points around 2D point 1508, and 2D point group 1552 include 2D point 1548 and 2D points around 2D point 1548. 3D rays 1514 are generated based at least in part on camera pose 1504 and 2D point group 1512, and 3D rays 1554 are generated based at least in part on camera pose 1544 and 2D point group 1552. 3D points 1556 are generated based on intersections of 3D rays 1514 and 1554. 3D point distribution 1503 of 3D points 1556 is generated; as illustrated 3D point distribution is a cuboid shape, but other convex hull geometries are enabled. A perturbation error for image pair 1502 and 1542 is calculated based on a degree of 3D point distribution 1503. In some embodiments, 3D point distribution 1503 may be measured according to a dimensional metric of the 3D point distribution; for example, in a cuboid 3D point distribution, a degree of 3D point distribution 1503 may be expressed as a dimensional value of a 3D diagonal of the cuboid.

For image pair 1502 and 1562 of FIG. 15C, 2D point groups 1512 and 1572 are generated in similar fashion as described in relation to FIG. 15A. 2D point group 1512 includes 2D point 1508 and 2D points around 2D point 1508, and 2D point group 1572 includes 2D point 1568 and 2D points around 2D point 1568. 3D rays 1514 are generated based at least in part on camera pose 1504 and 2D point group 1512, and 3D rays 1574 are generated based at least in part on camera pose 1564 and 2D point group 1572. 3D points 1576 are generated based on intersections of 3D rays 1514 and 1574. 3D point distribution 1505 of 3D points 1576 is generated; as illustrated 3D point distribution is a cuboid shape, but other convex hull geometries are enabled. A perturbation error for image pair 1502 and 1562 is calculated based on a degree of 3D point distribution 1505. In some embodiments, 3D point distribution 1505 may be measured according to a dimensional metric of the 3D point distribution; for example, in a cuboid 3D point distribution, a degree of 3D point distribution 1505 may be expressed as a dimensional value of a 3D diagonal of the cuboid.

Of image pairs 1502 and 1522 of FIG. 15A, 1502 and 1542 of FIG. 15B, 1502 and 1562 of FIG. 15C, image pair 1502 and 1562 may be favored for selection, such as by weighting described supra, as it is associated with a smallest perturbation error based on degrees of 3D point distributions 1501, 1503, and 1505 as described herein.

The above may be replicated for 2D points 1510, 1524, 1544, and 1564 to generate additional 3D point distributions which may be used calculating perturbation error and selecting a pair of image pairs.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of selecting a pair of consistent real-world camera poses for three-dimensional reconstruction, the method comprising:

receiving a plurality of images and an associated plurality of camera poses;

for each image of the plurality of images, receiving a two-dimensional (2D) line segment, wherein the 2D line segments of the plurality of images correspond to one another;

for each pair of images of the plurality of images:

calculating a perturbation error, wherein the perturbation error quantifies a degree of a three-dimensional (3D) point distribution based on one or more offset pixels proximate to each of a first point of the 2D line segment in a first image of the pair of images and a corresponding second point of the 2D line segment in a second image of the pair of images;

generating a 3D line segment based on the 2D line segment in the first image of the pair of images and the 2D line segment in the second image of the pair of images;

calculating reprojection errors of the 3D line segment into each of the plurality of images; and calculating a weight based on the perturbation error and the reprojection errors; and selecting a pair of camera poses of pairs of camera poses associated with a largest weight.

2. The method of claim 1, wherein calculating the weight comprises calculating a product of an inverse of the perturbation error and an inverse of a sum of the reprojection errors.

3. The method of claim 1, further comprising calculating a weighted average measurement for a dimensional value of each 3D line segment.

4. The method of claim 1, wherein calculating the reprojection errors of the 3D line segment comprises, calculating a reprojection error for each image of the plurality of images based on a difference between a reprojection of a first end point of the 3D line segment and a corresponding first end point of the 2D line segment in the image and a difference between a reprojection of a second end point of the 3D line segment and a corresponding second end point of the 2D line segment in the image.

5. The method of claim 1, wherein calculating the weight comprises calculating a product of an inverse of the perturbation error, an inverse of a sum of the reprojection errors, and a distance between a first camera pose associated with the first image and a second camera pose associated with the second image.

6. The method of claim 1, further comprising generating a dimensional value of a generated 3D line segment generated based on a 2D line segment in a first image associated with a first camera pose of the selected pair of camera poses and a 2D line segment in a second image associated with a second camera pose of the selected pair of camera poses.

7. The method of claim 6, wherein the dimensional value is derived from an augmented reality dimensional value.

8. The method of claim 6, further comprising scaling a 3D building model based on selected pair of camera poses and according to the generated dimensional value.

9. The method of claim 6, wherein generating a dimensional value of the generated 3D line segment comprises selecting a 3D line segment associated with a greatest weight.

10. One or more non-transitory computer-readable media storing instructions that, when executed by one or more processors, cause the one or more processors to perform a method of selecting a pair of consistent real-world camera poses for three-dimensional reconstruction, the method comprising:

receiving a plurality of images and an associated plurality of camera poses;

for each image of the plurality of images, receiving a two-dimensional (2D) line segment, wherein the 2D line segments of the plurality of images correspond to one another;

for each pair of images of the plurality of images:

calculating a perturbation error, wherein the perturbation error quantifies a degree of a three-dimensional (3D) point distribution based on one or more offset pixels proximate to each of a first point of the 2D line segment in a first image of the pair of images and a corresponding second point of the 2D line segment in a second image of the pair of images;

generating a 3D line segment based on the 2D line segment in the first image of the pair of images and the 2D line segment in the second image of the pair of images;

calculating reprojection errors of the 3D line segment into each of the plurality of images; and calculating a weight based on the perturbation error and the reprojection errors; and selecting a pair of camera poses of pairs of camera poses associated with a largest weight.

11. The media of claim 10, wherein calculating the weight comprises calculating a product of an inverse of the perturbation error and an inverse of a sum of the reprojection errors.

12. The media of claim 10, further comprising instructions for calculating a weighted average measurement for a dimensional value of each 3D line segment.

13. The media of claim 10, wherein calculating the reprojection errors of the 3D line segment comprises instructions for, calculating a reprojection error for each image of the plurality of images based on a difference between a reprojection of a first end point of the 3D line segment and a corresponding first end point of the 2D line segment in the image and a difference between a reprojection of a second end point of the 3D line segment and a corresponding second end point of the 2D line segment in the image.

14. The media of claim 10, wherein calculating the weight comprises instructions for calculating a product of an inverse of the perturbation error, an inverse of a sum of the reprojection errors, and a distance between a first camera pose associated with the first image and a second camera pose associated with the second image.

15. The media of claim 10, further comprising instructions for generating a dimensional value of a generated 3D line segment based on a 2D line segment in a first image associated with a first camera pose of the selected pair of camera poses and a 2D line segment in a second image associated with a second camera pose of the selected pair of camera poses.

16. The media of claim 15, wherein the dimensional value is derived from an augmented reality dimensional value.

17. The media of claim 15, further comprising instructions for scaling a 3D building model based on the selected pair of camera poses and according to the generated dimensional value.

18. The media of claim 15, wherein generating a dimensional value of the generated 3D line segment comprises instructions for selecting a 3D line segment associated with a greatest weight.

\*    \*    \*    \*    \*